United States Patent
Khurewattanakul et al.

(10) Patent No.: US 11,427,187 B2
(45) Date of Patent: Aug. 30, 2022

(54) AUTOMATIC VALET PARKING SYSTEM AND STORAGE MEDIUM

(71) Applicant: DENSO CORPORATION, Kariya (JP)

(72) Inventors: Sirinda Khurewattanakul, Kariya (JP); Masashi Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 177 days.

(21) Appl. No.: 16/910,223

(22) Filed: Jun. 24, 2020

(65) Prior Publication Data
US 2020/0406887 A1   Dec. 31, 2020

(30) Foreign Application Priority Data

Jun. 28, 2019   (JP) .............................. JP2019-121476

(51) Int. Cl.
| | |
|---|---|
| *B60W 30/06* | (2006.01) |
| *G08G 1/14* | (2006.01) |
| *B62D 15/02* | (2006.01) |
| *B60W 60/00* | (2020.01) |
| *G06F 21/30* | (2013.01) |

(52) U.S. Cl.
CPC ........ *B60W 30/06* (2013.01); *B60W 60/0051* (2020.02); *B62D 15/0285* (2013.01); *G08G 1/143* (2013.01); *G08G 1/146* (2013.01); *G08G 1/149* (2013.01); *G06F 21/30* (2013.01)

(58) Field of Classification Search
CPC .............. B60W 30/06; B60W 60/0051; B62D 15/0285; G08G 1/143; G08G 1/146; G08G 1/149
See application file for complete search history.

(56) References Cited

U.S. PATENT DOCUMENTS

| | | | | |
|---|---|---|---|---|
| 10,699,574 | B1 * | 6/2020 | Zeryihun | .................. G06T 7/80 |
| 11,189,170 | B2 * | 11/2021 | Maruiwa | ................ G06Q 10/02 |
| 2015/0130641 | A1 * | 5/2015 | Rahman | .................. G08G 1/144 |
| | | | | 340/932.2 |
| 2017/0118307 | A1 * | 4/2017 | Beaurepaire | ........... G08G 1/144 |
| 2020/0198620 | A1 * | 6/2020 | Nakata | .................. H04W 4/024 |
| 2020/0294399 | A1 * | 9/2020 | Schuller | ................. G08G 1/065 |

FOREIGN PATENT DOCUMENTS

| | | | | |
|---|---|---|---|---|
| JP | 2018-041381 | A | 3/2018 | |
| JP | 2018041381 | A  * | 3/2018 | ............ B60W 30/06 |
| WO | WO-2018007065 | A1 * | 1/2018 | ............ B60W 30/06 |

\* cited by examiner

*Primary Examiner* — Dale W Hilgendorf
(74) *Attorney, Agent, or Firm* — Harness, Dickey & Pierce, P.L.C.

(57) ABSTRACT

An automatic valet parking system includes: a terminal device having an application information generator for transmitting application information for the valet parking to a parking place server and a vehicle manufacturer server; a vehicular device having an autonomous driving controller for performing autonomous driving control according to a drive plan when receiving a temporary key; a parking place server having a key request generator for receiving the application information and transmitting a temporary key request to the vehicle manufacturer server; and a vehicle manufacturer server having a key request verification portion for verifying authenticity of the temporary key request and a temporary key generator for transmitting the temporary key to the vehicular device when a verification result is true. The parking place server or the vehicular device includes a drive planning portion for generating a drive plan to a targeted parking position.

8 Claims, 14 Drawing Sheets

AUTOMATIC VALET PARKING SYSTEM AND STORAGE MEDIUM

CROSS REFERENCE TO RELATED APPLICATION

The present application claims the benefit of priority from Japanese Patent Application No. 2019-121476 filed on Jun. 28, 2019. The entire disclosure of the above application is incorporated herein by reference.

TECHNICAL FIELD

The present disclosure relates to an automatic valet parking system and a storage medium to provide valet parking under autonomous driving control.

BACKGROUND

Conventionally, there is proposed the technology in terms of a valet parking system under automatic operation control (i.e., autonomous driving control). The valet parking system under automatic operation control is hereinafter also described as an automatic valet parking system. According to the system, when the automatic valet parking is performed, a terminal device generates a temporary key comparable to the authorization to perform the automatic operation control. The terminal device transmits the temporary key to an automobile and a parking place server apparatus as a server provided for a parking place. The above-described system improves the system security by allowing the automobile to verify a temporary key match.

SUMMARY

According to an example aspect, an automatic valet parking system includes: a terminal device having an application information generator for transmitting application information for the valet parking to a parking place server and a vehicle manufacturer server; a vehicular device having an autonomous driving controller for performing autonomous driving control according to a drive plan when receiving a temporary key; a parking place server having a key request generator for receiving the application information and transmitting a temporary key request to the vehicle manufacturer server; and a vehicle manufacturer server having a key request verification portion for verifying authenticity of the temporary key request and a temporary key generator for transmitting the temporary key to the vehicular device when a verification result is true. The parking place server or the vehicular device includes a drive planning portion for generating a drive plan to a targeted parking position.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
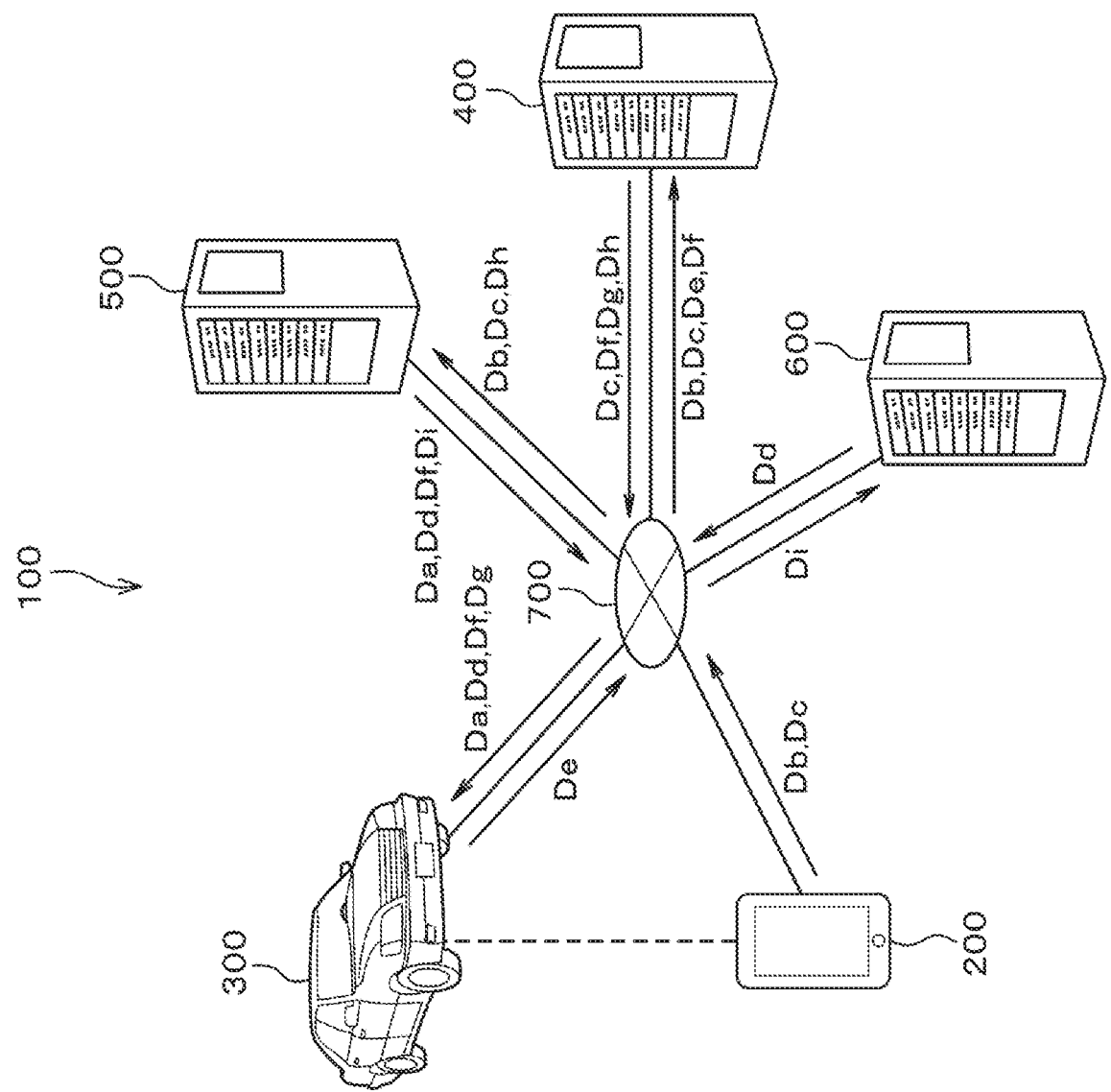
FIG. 1 is a drawing illustrating an overall configuration of the automatic valet parking system according to a first embodiment.

A conceivable valet parking system provides the parking place server apparatus with the temporary key that gives the authorization to operate the automobile. A digital key such as the temporary key for the automobile contains vehicle information and is provided with the authorization to perform various manipulations such as locking and unlocking doors. The digital key is highly confidential and is generated based on a method unique to each vehicle manufacturer for manufacturing a vehicle.

Because of this situation, the digital key must not be passed to a third party except for the vehicle manufacturer. If the third party acquires the digital key, the third party may decipher the workings of the key. The above-described system does not fully improve the system security and leaves a security issue.

Thus, an automatic valet parking system, an automatic valet parking program, and a storage medium are provided to be capable of enhancing the system security.

According to a first aspect of the present embodiments, an automatic valet parking system to perform valet parking under autonomous driving control, includes: a terminal device; a vehicular device arranged on a vehicle; a parking place server arranged for a parking place; and a vehicle manufacturer server directly or indirectly controlled by a vehicle manufacturer. The terminal device, the vehicular device, the parking place server, and the vehicle manufacturer server are configured to mutually transmit and receive data. The terminal device includes an application information generator. The parking place server includes a key request generator. The vehicle manufacturer server includes a key request verification portion and a temporary key generator. At least one of the parking place server and the vehicular device includes a drive planning portion. The vehicular device includes an autonomous driving controller. The application information generator generates application information as information about an application for the valet parking and transmits the application information to the parking place server and the vehicle manufacturer server. The key request generator receives the application information transmitted from the terminal device, generates a temporary key request for requesting to generate a temporary key, and transmits the temporary key request to the vehicle manufacturer server. The key request verification portion receives the application information transmitted from the terminal device, receives the temporary key request transmitted from the parking place server, and verifies authenticity of the temporary key request. When the key request verification portion provides a verification result to be true, the temporary key generator generates the temporary key and transmits the temporary key to the vehicular device. The drive planning portion generates a drive plan including a route to a targeted parking position for the vehicle. When the autonomous driving controller receives the temporary key transmitted from the vehicle manufacturer server, the autonomous driving controller performs autonomous driving control according to the drive plan generated by the drive planning portion.

According to a second aspect of the present embodiments, an automatic valet parking program for executing valet parking under autonomous driving control by a terminal device, a vehicular device, a parking place server arranged for a parking place, and a vehicle manufacturer server directly or indirectly controlled by a vehicle manufacturer, which are configured to mutually transmit and receive data, includes: performing an application information generating procedure using the terminal device; performing a key request generating procedure using the parking place server; performing a key request verification procedure and a temporary key generating procedure using the vehicle manufacturer server; performing an drive plan procedure using at least one of the parking place server and the vehicular device; and performing an autonomous driving control procedure using the vehicular device. The application information generating procedure includes: generating application information as information about an application of the valet parking and transmitting the application information to the parking place server and the vehicle manufacturer server. The key request generating procedure includes: receiving the application information transmitted from the terminal device; generating a temporary key request for requesting to generate a temporary key, and transmitting the temporary key request to the vehicle manufacturer server. The key request verification procedure includes: receiving the application information transmitted from the terminal device; receiving the temporary key request transmitted from the parking place server; and verifying authenticity of the temporary key request. The temporary key generating procedure includes: generating the temporary key and transmitting the temporary key to the vehicle when a verification result in the key request verification procedure is true. The drive plan procedure includes: generating an drive plan including a route to a targeted parking position for the vehicle. The autonomous driving control procedure includes: performing autonomous driving control according to the drive plan generated in the drive planning procedure when receiving the temporary key transmitted from the vehicle manufacturer server.

According to an aspect of the present disclosure, a computer-readable non-transitory tangible storage medium stores the automatic valet parking program according to the second aspect.

The automatic valet parking system, the automatic valet parking program and the computer-readable non-transitory tangible storage medium according to the above-described configuration allows the temporary key as a digital key for the vehicle to be directly exchanged between the vehicle manufacturer server apparatus and the vehicle. The temporary key is not supplied to the parking place server apparatus. Even if a malicious third party hacks the parking place server apparatus, it is impossible to acquire the temporary key or decipher the workings of the digital key for the vehicle. The above-described configuration provides an excellent effect of improving the confidentiality of the workings of the digital key for the vehicle and therefore improving the system security.

First Embodiment

The description below explains a first embodiment with reference to FIGS. 1 through 4.

Overall Configuration of Automatic Valet Parking System 100

As illustrated in FIG. 1, an automatic valet parking system 100 according to the present embodiment includes a terminal device 200, an automobile (i.e., a vehicular device) 300 comparable to a vehicle, a parking place server apparatus 400, a vehicle manufacturer server apparatus 500, and a map server apparatus 600. The automatic valet parking system 100 performs valet parking under automatic operation control. In the description below, the automatic valet parking is abbreviated as AVP if necessary. In this case, an owner of the automobile 300 corresponds to a user who carries the terminal device 200. According to the present embodiment, the user is the owner of the automobile 300.

The terminal device 200 includes a communication function and mainly stores authentication information about the owner. The terminal device 200 and the automobile (i.e., a vehicular device) 300 can mutually transmit and receive data to be capable of communication. The terminal device 200 and the automobile 300 may transmit and receive data through the use of the near field communication as indicated by a broken line in FIG. 1 or through the use of a network 700, for example. The network 700 may include wireless LAN and mobile communication networks, for example.

The terminal device 200 is communicably connected to the parking place server apparatus 400 and the vehicle manufacturer server apparatus 500 via the network 700. The automobile 300 is communicably connected to the parking place server apparatus 400 and the vehicle manufacturer server apparatus 500 via the network 700. The vehicle manufacturer server apparatus 500, the parking place server apparatus 400, and the map server apparatus 600 are communicably connected via the network 700. The AVP system 100 enables the terminal device 200, the automobile 300, the parking place server apparatus 400, the vehicle manufacturer server apparatus 500, and the map server apparatus 600 to mutually transmit and receive data.

According to the present embodiment, the terminal device 200 represents a smart device such as a smartphone or a tablet terminal, for example. The terminal device 200 may also represent an electronic automobile key that stores authentication information about the owner and includes a communication function. The automobile 300 includes an automatic operation function. The parking place server apparatus 400 is provided for a parking place of a facility that provides the valet parking service. The parking place server apparatus 400 comes under the jurisdiction and administration of the facility or a parking place management company that contracts with the facility.

The vehicle manufacturer server apparatus 500 is operated by a vehicle manufacturer that manufactures the automobile 300. In this case, the vehicle manufacturer directly manages the vehicle manufacturer server apparatus 500. The vehicle manufacturer server apparatus 500 may be indirectly managed by another company that enters into a confidentiality agreement with the vehicle manufacturer and is entrusted with the operation by the vehicle manufacturer.

The map server apparatus 600 acquires effective zone information as information about an effective zone for a temporary key to be described. The map server apparatus 600 transmits the effective zone information to the vehicle manufacturer server apparatus 500. In the description below, the effective zone is also termed as an effective stall and the effective zone information is also termed as effective stall information. The map server apparatus 600 comes under the jurisdiction and administration of a reliable third-party organization such as a public administration concerning the automatic operation control, a specialized official organization in charge of surveying, or pertinent organizations of Ministry of Land, Infrastructure, Transport and Tourism.

Detailed Configuration of Terminal Device 200

The terminal device 200 internally stores an electronic key. The authentication using the electronic key enables the automobile 300 to perform the automatic operation. However, it is unfavorable to unlimitedly transmit the electronic key to external devices, for example, causing degradation of the security.

As will be described in detail later, the vehicle manufacturer server apparatus 500 generates temporary key Da functioning equally to the electronic key only when AVP is performed. Similar to the electronic key, temporary key Da can authenticate the owner and enable the automobile 300 to perform the automatic operation. However, temporary key Da is disabled under conditions different from the electronic key, for example, when a predetermined effective period is expired or the automobile 300 goes outside an effective zone.

Figure 2:
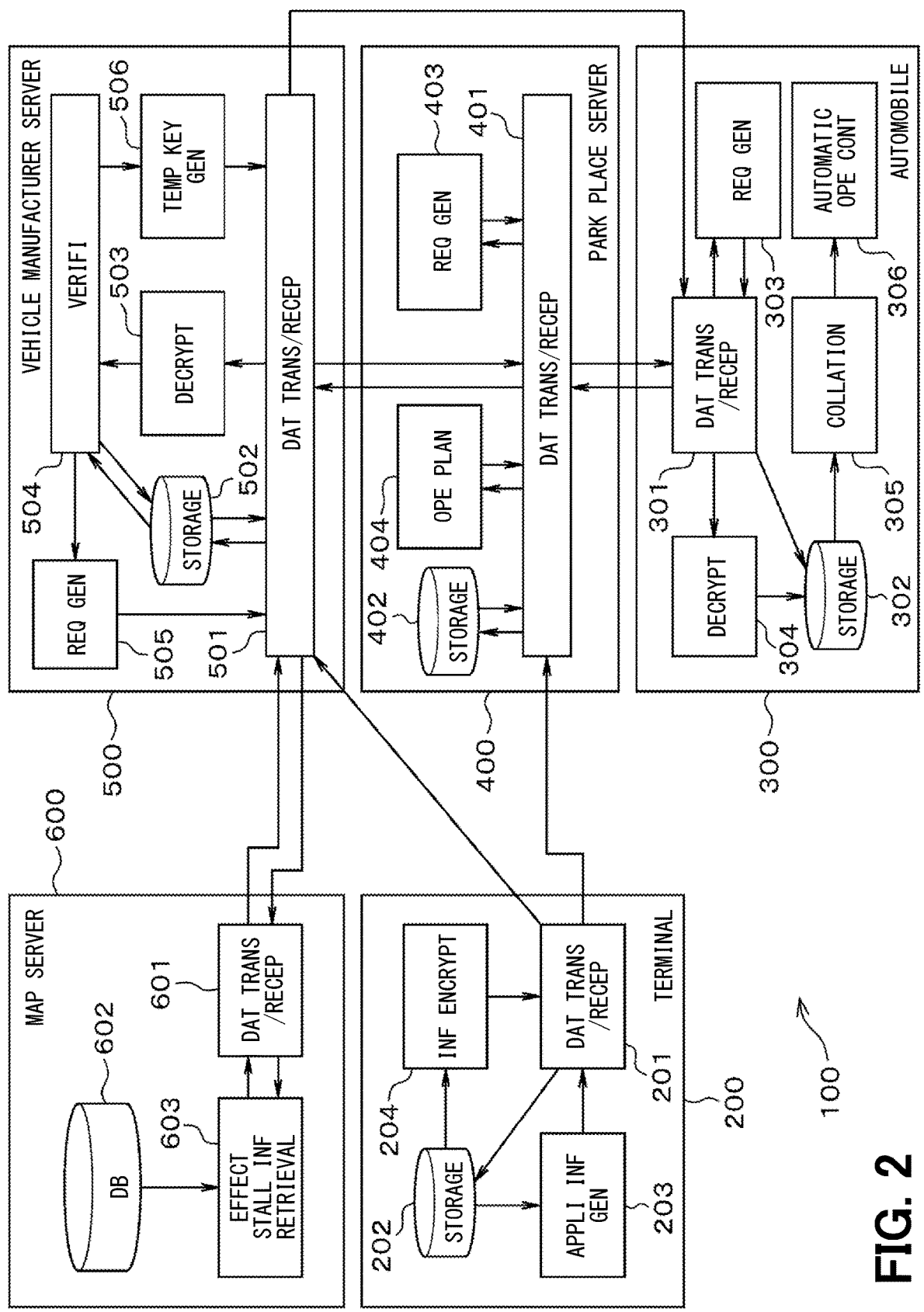
FIG. 2 is a drawing schematically illustrating the detailed configuration of each part of the automatic valet parking system according to the first embodiment.

As illustrated in FIG. 2, the terminal device 200 includes a data transmission/reception portion 201 and a storage portion 202. The data transmission/reception portion 201 transmits and receives various types of data to and from external devices. The storage portion 202 stores various types of data. The storage portion 202 also stores various types of information received via the data transmission/reception portion 201 as well as various types of previously stored information. The terminal device 200 includes function blocks such as an application information generating portion (i.e., an application information generator) 203 and an information encrypting portion 204.

The function blocks are implemented as software in such a manner that a CPU included in the terminal device 200 executes a computer program stored in a non-transitory tangible storage medium and performs a process corresponding to the computer program. At least part of the function blocks may be implemented as hardware.

The application information generating portion 203 generates application information db, namely, information about the application of valet parking. Application information db includes mainly includes user information, information about a parking place as where to apply, and information about the utilization time of the parking place. The application information generating portion 203 transmits generated application information db to the parking place server apparatus 400 and the vehicle manufacturer server apparatus 500 via the data transmission/reception portion 201. Each process performed by the application information generating portion 203 is comparable to an application information generating procedure.

In this case, the storage portion 202 stores vehicle information as information about the automobile 300. The vehicle information includes a car model (such as an ordinary-sized motor vehicle or a mini-sized vehicle), a license number, the size such as vehicle height, and information about the user as an owner of the vehicle, for example. The information such as the car model or the size is useful for the selection of a parking slot. The information encrypting portion 204 reads the vehicle information from the storage portion 202 and encrypts the vehicle information. The information encrypting portion 204 transmits encrypted vehicle information Dc to the parking place server apparatus 400 and the vehicle manufacturer server apparatus 500 via the data transmission/reception portion 201.

Application information db and vehicle information Dc are simultaneously transmitted to the parking place server apparatus 400. Application information db and vehicle information Dc are simultaneously transmitted to the vehicle manufacturer server apparatus 500. Application information db to be transmitted to the vehicle manufacturer server apparatus 500 just needs to include at least information about the parking place as where to apply. In the description below, application information db and vehicle information Dc transmitted to the vehicle manufacturer server apparatus 500 may be also collectively termed as authentication information.

Detailed Configuration of Automobile 300

The automobile 300 includes a data transmission/reception portion 301 and a storage portion 302. The data transmission/reception portion 301 transmits and receives various types of data to and from external devices. The storage portion 302 stores various types of data. The storage portion 302 also stores various types of information received via the data transmission/reception portion 301 as well as various types of previously stored information. The automobile 300 includes function blocks such as a request generating portion 303, a decryption portion 304, a collation portion 305, and an automatic operation control portion (i.e., an autonomous driving controller) 306.

The function blocks are implemented as software in such a manner that a CPU included in the automobile 300 executes a computer program stored in a non-transitory tangible storage medium and performs a process corresponding to the computer program. At least part of the function blocks may be implemented as hardware.

The request generating portion 303 receives temporary key Da and effective zone information Dd transmitted from the vehicle manufacturer server apparatus 500 via the data transmission/reception portion 301 and then generates operation plan request (i.e., a drive plan request) De to request generation of an operation plan (i.e., a drive plan). The description later explains how the vehicle manufacturer server apparatus 500 transmits temporary key Da and effective zone information Dd. The request generating portion 303 transmits generated operation plan request De to the parking place server apparatus 400 via the data transmission/reception portion 301.

The decryption portion 304 receives temporary key Da transmitted from the vehicle manufacturer server apparatus 500, receives password Df transmitted from the parking place server apparatus 400, and then verifies whether a combination of these is effective. The decryption portion 304 functions as a key verification portion. The description later explains how the parking place server apparatus 400 transmits password Df. When the above-described combination is effective (i.e., proper), the decryption portion 304 uses password Df to unlock or validate temporary key Da. Each process performed by the decryption portion 304 is comparable to a key verification procedure.

The collation portion 305 collates operation plan Dg transmitted from the parking place server apparatus 400 with effective zone information Dd transmitted from the vehicle manufacturer server apparatus 500. The description later explains how the parking place server apparatus 400 transmits operation plan Dg. As a result of the collation, the collation portion 305 determines whether a route included in operation plan Dg falls within the rage of an effective zone. The automatic operation control portion 306 receives temporary key Da transmitted from the vehicle manufacturer server apparatus 500 via the data transmission/reception portion 301, receives operation plan Dg and password Df transmitted from the parking place server apparatus 400 via the data transmission/reception portion 301 and then performs the automatic operation control according to operation plan Dg.

The verification result from the decryption portion 304 may show that the combination of temporary key Da and password Df is effective, namely, the decryption portion 304 validates temporary key Da. In this case, the automatic operation control portion 306 determines that operation plan Dg transmitted along with password Df is usable. The automatic operation control portion 306 performs the automatic operation control according to operation plan Dg.

In this case, the automatic operation control portion 306 determines whether operation plan Dg is usable in consideration of the collation result from the collation portion 305. Specifically, as a result of the collation, when the determination shows that all routes included in operation plan Dg fall within the range of the effective zone, the automatic operation control portion 306 determines that operation plan Dg is usable. Meanwhile, when the determination shows that at least part of the routes included in operation plan Dg exceeds the range of the effective zone, the automatic operation control portion 306 determines that operation plan Dg is unusable. Each process performed by the automatic operation control portion 306 is comparable to an automatic operation control procedure.

Detailed Configuration of Parking Place Server Apparatus 400

The parking place server apparatus 400 includes a data transmission/reception portion 401 and a storage portion 402. The data transmission/reception portion 401 transmits and receives various types of data to and from external devices. The storage portion 402 stores various types of data. The storage portion 402 also stores various types of information received via the data transmission/reception portion 401 as well as various types of previously stored information. The parking place server apparatus 400 includes function blocks such as a request generating portion (i.e., a key request generator) 403 and an operation planning portion 404.

The function blocks are implemented as software in such a manner that a CPU included in the parking place server apparatus 400 executes a computer program stored in a non-transitory tangible storage medium and performs a process corresponding to the computer program. At least part of the function blocks may be implemented as hardware.

The request generating portion 403 receives application information db and encrypted vehicle information Dc transmitted from the terminal device 200 via the data transmission/reception portion 401 and then generates temporary key request Dh to request generation of temporary key Da. The request generating portion 403 functions as a key request generating portion. The request generating portion 403 transmits generated temporary key request Dh and encrypted vehicle information Dc to the vehicle manufacturer server apparatus 500 via the data transmission/reception portion 401. Each process performed by the request generating portion 403 is comparable to a key request generating procedure.

The operation planning portion 404 receives operation plan request De transmitted via the data transmission/reception portion 401 and then generates operation plan Dg. Operation plan Dg mainly includes the current position of the automobile 300, a targeted parking position of the automobile 300, the route to the targeted parking position from the current position, timings to go straight, make turns, and go backward, and the travel speed of the automobile 300. The targeted parking position is settled at an optimum position in consideration of the availability in the parking place. The operation planning portion 404 receives password Df transmitted from the vehicle manufacturer server apparatus 500 via the data transmission/reception portion 401 and then transmits password Df along with generated operation plan Dg to the automobile 300 via the data transmission/reception portion 401. Each process performed by the operation planning portion 404 is comparable to an operation plan procedure.

Detailed Configuration of Vehicle Manufacturer Server Apparatus 500

The vehicle manufacturer server apparatus 500 includes a data transmission/reception portion 501 and a storage portion 502. The data transmission/reception portion 501 transmits and receives various types of data to and from external devices. The storage portion 502 stores various types of data. The storage portion 502 also stores various types of information received via the data transmission/reception portion 501 as well as various types of previously stored information. The vehicle manufacturer server apparatus 500 includes function blocks such as a decryption portion 503, a verification portion 504, a request generating portion 505, and a temporary key generating portion (i.e., a temporary key generator) 506.

The function blocks are implemented as software in such a manner that a CPU included in the vehicle manufacturer server apparatus 500 executes a computer program stored in a non-transitory tangible storage medium and performs a process corresponding to the computer program. At least part of the function blocks may be implemented as hardware.

The decryption portion 503 receives encrypted vehicle information Dc transmitted from the terminal device 200 via the data transmission/reception portion 501 and then decrypts vehicle information Dc. The decryption portion 503 receives encrypted vehicle information Dc transmitted from the parking place server apparatus 400 via the data transmission/reception portion 501 and then decrypts vehicle information Dc. The verification portion 504 receives application information db transmitted from the terminal device 200 via the data transmission/reception portion 501, receives temporary key request Dh transmitted from the parking place server apparatus 400 via the data transmission/reception portion 501, and then verifies the authenticity of temporary key request Dh. The verification portion 504 functions as a key request verification portion.

Specifically, the verification portion 504 verifies the information transmitted from the terminal device 200 and the parking place server apparatus 400 and thereby verifies the authenticity of temporary key request Dh as follows. The verification portion 504 determines whether there is a match between vehicle information Dc transmitted from the terminal device 200 and vehicle information Dc transmitted from the parking place server apparatus 400. The verification portion 504 determines whether there is a match between the parking place as where to apply included in application information db transmitted from the terminal device 200 and the parking place provided with the parking place server apparatus 400 as an origin of transmitting temporary key request Dh, namely, whether the parking place information matches.

If vehicle information Dc matches and the parking place information matches, the verification portion 504 determines that temporary key request Dh is authentic. If either or both of vehicle information Dc and the parking place information do not match, the verification portion 504 determines that temporary key request Dh is unauthentic. Each process performed by the verification portion 504 is comparable to a key request verification procedure. The request generating portion 505 generates zone information request Di to request transmission of effective zone information Dd and functions as a zone request generating portion.

The request generating portion 505 transmits generated zone information request Di to the map server apparatus 600 via the data transmission/reception portion 501. Each process performed by the request generating portion 505 is comparable to a zone request generating procedure. The temporary key generating portion 506 generates temporary key Da when a verification result from the verification portion 504 is true. The temporary key generating portion 506 receives effective zone information Dd transmitted from the map server apparatus 600 via the data transmission/reception portion 501 and then transmits effective zone information Dd received along with generated temporary key Da to the automobile 300 via the data transmission/reception portion 501.

When generating temporary key Da, the temporary key generating portion 506 also generates password Df to validate temporary key Da. Password Df may represent a one-time password, for example. The temporary key generating portion 506 transmits generated password Df to the automobile 300 via the parking place server apparatus 400. Each process performed by the temporary key generating portion 506 is comparable to a temporary key generating procedure.

Detailed Configuration of Map Server Apparatus 600

The map server apparatus 600 includes a data transmission/reception portion 601 and a database 602. The data transmission/reception portion 601 transmits and receives various types of data to and from external devices. The database 602 stores various types of data. The map server apparatus 600 includes an effective stall information retrieval portion 603 as a function block. The effective stall information retrieval portion 603 is implemented as software in such a manner that a CPU included in the map server apparatus 600 executes a computer program stored in a non-transitory tangible storage medium and performs a process corresponding to the computer program. The effective stall information retrieval portion 603 may be implemented as hardware.

The effective stall information retrieval portion 603 acquires effective zone information Dd as information about the effective zone for temporary key Da. The effective stall information retrieval portion 603 functions as an effective zone acquisition portion. The effective zone is comparable to a travelable range in which temporary key Da enables the automobile 300 to travel. The effective zone information is comparable to travelable range information as information about the travelable range. Specifically, the effective stall information retrieval portion 603 receives zone information request Di transmitted from the vehicle manufacturer server apparatus 500 via the data transmission/reception portion 601 and then searches for various types of data stored in the database 602 to acquire effective zone information Dd.

The effective stall information retrieval portion 603 transmits acquired effective zone information Dd to the vehicle manufacturer server apparatus 500 via the data transmission/reception portion 601. Each process performed by the effective stall information retrieval portion 603 is comparable to an effective zone acquisition procedure. Effective zone information Dd is previously provided by a reliable third-party organization, for example, and is stored in the database 602. Effective zone information Dd provides map information that stores the effective zone as a zone effectively available to temporary key Da. The effective zone can be targeted at only an area to provide AVP services, namely, only an area in the parking place.

Effects of the above-described configuration will be described.

Figure 3:
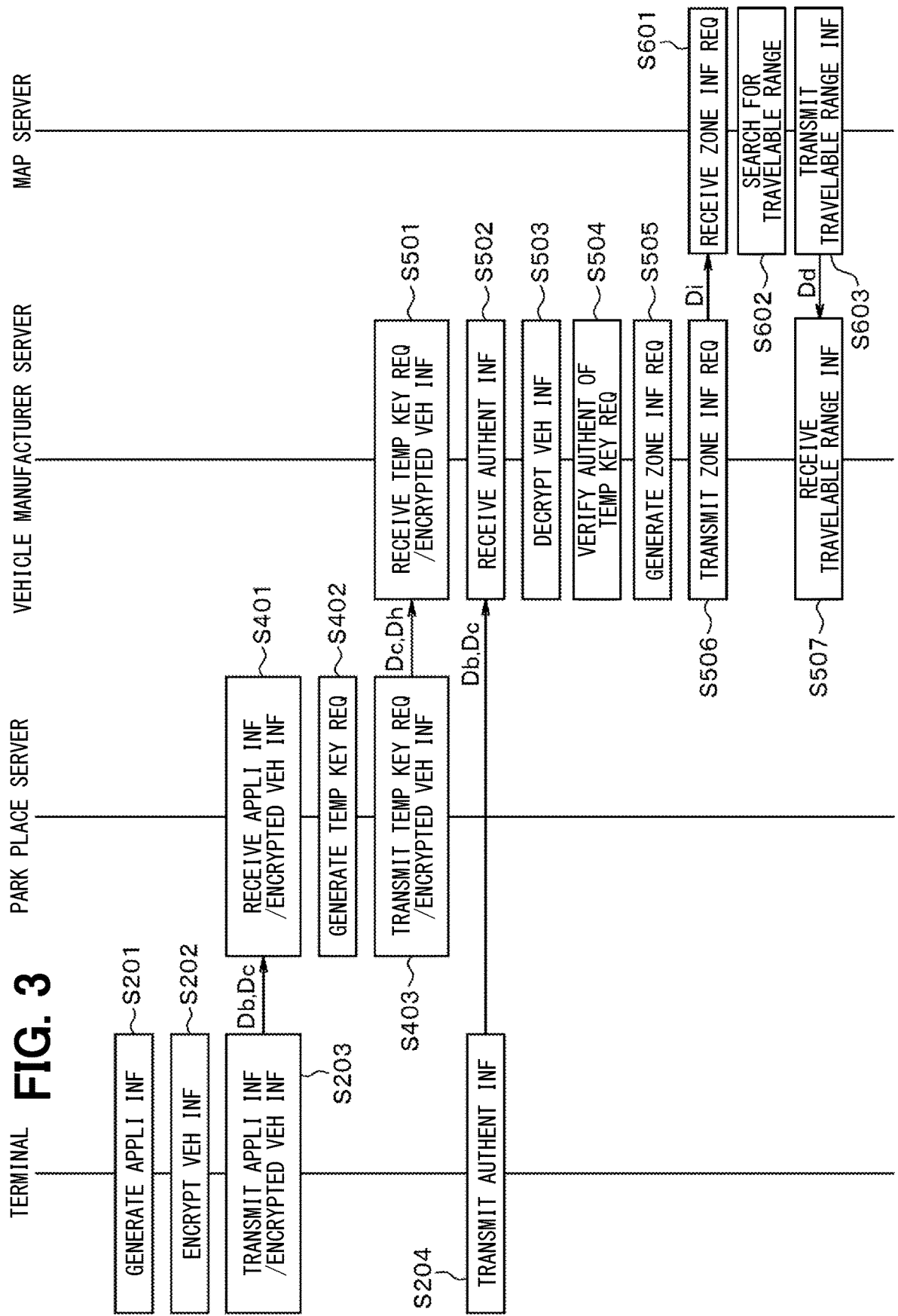
FIG. 3 is a drawing as part 1 of 2 illustrating a process flow of each part when the automatic valet parking according to the first embodiment is performed.
Figure 4:
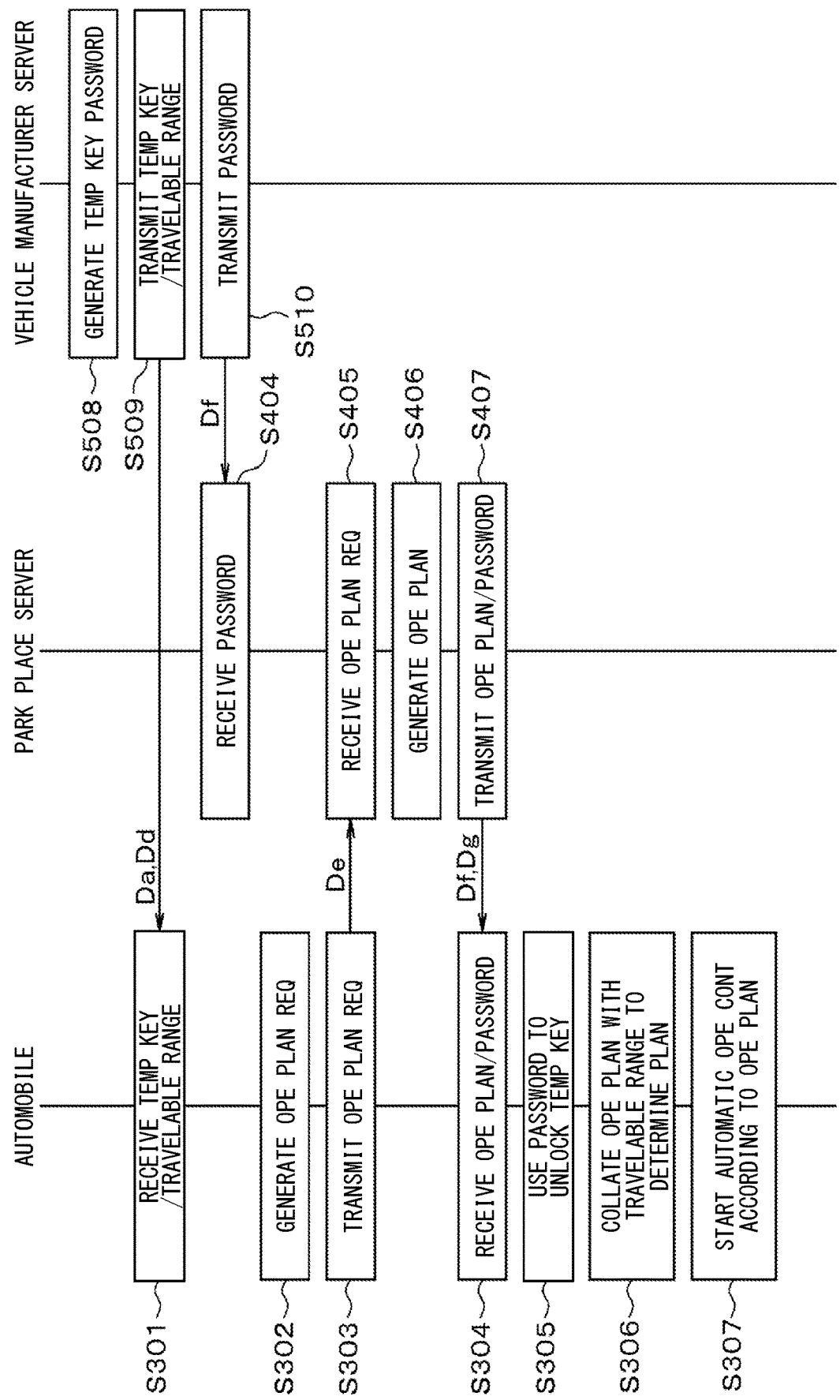
FIG. 4 is a drawing as part 2 of 2 illustrating a process flow of each part when the automatic valet parking according to the first embodiment is performed.

For example, FIGS. 3 and 4 illustrate processing details of each portion when the AVP system 100 according to the present embodiment performs AVP.

Flow of Process from Applying for AVP to Receiving Travelable Range

FIG. 3 illustrates the contents of the process from applying for AVP to receiving a travelable range. When a user manipulation applies for valet parking, in step S201, the terminal device 200 recognizes the application manipulation and generates application information db according to the contents of the manipulation.

In step S202, the terminal device 200 encrypts vehicle information Dc. In step S203, the terminal device 200 transmits application information db and encrypted vehicle information Dc to the parking place server apparatus 400. In step S204, the terminal device 200 transmits application information db and encrypted vehicle information Dc, namely, the authentication information about the valet parking application to the vehicle manufacturer server apparatus 500.

In step S401, the parking place server apparatus 400 receives application information db and encrypted vehicle information Dc and then proceeds to step S402 to generate temporary key request Dh. In step S403, the parking place server apparatus 400 transmits temporary key request Dh and encrypted vehicle information Dc to the vehicle manufacturer server apparatus 500. According to the present embodiment, the vehicle manufacturer server apparatus 500 can decrypt vehicle information Dc encrypted by the terminal device 200, but the parking place server apparatus 400 cannot. Therefore, the parking place server apparatus 400 cannot identify the contents of vehicle information Dc containing personal information, for example, transmitted from the terminal device 200.

The vehicle manufacturer server apparatus 500 receives temporary key request Dh and encrypted vehicle information Dc in step S501, receives the authentication information in step S502, and then proceeds to step S503 to decrypt vehicle information Dc. In step S504, the vehicle manufacturer server apparatus 500 verifies the authenticity of temporary key request Dh. The vehicle manufacturer server apparatus 500 performs the process in step S505 and later only if temporary key request Dh is determined to be authentic.

If temporary key request Dh is determined to be unauthentic, the vehicle manufacturer server apparatus 500 transmits an error message to the terminal device 200 and notifies the user that temporary key Da cannot be generated and, therefore, AVP is unavailable. Thus, the whole process in the AVP system 100 terminates. In step S505, the vehicle manufacturer server apparatus 500 generates zone information request Di. In step S506, the vehicle manufacturer server apparatus 500 transmits zone information request Di to the map server apparatus 600.

In step S601, the map server apparatus 600 receives zone information request Di, then proceeds to step S602, and searches for various types of data stored in the database 602 to acquire effective zone information Dd, namely, the travelable range information. In step S603, the map server apparatus 600 transmits effective zone information Dd to the vehicle manufacturer server apparatus 500. In step S507, the vehicle manufacturer server apparatus 500 receives effective zone information Dd.

Flow of Process from Mainly Generating Temporary Key to Starting Automatic Operation FIG. 4 illustrates the contents of the process from mainly generating the temporary key to starting the automatic operation. As above, the vehicle manufacturer server apparatus 500 receives effective zone information Dd, namely, the travelable range information in step S507, then proceeds to step S508, and generates temporary key Da and password Df.

In step S509, the vehicle manufacturer server apparatus 500 transmits temporary key Da and effective zone information Dd to the automobile 300. In step S510, the vehicle manufacturer server apparatus 500 transmits password Df to the parking place server apparatus 400. In step S301, the automobile 300 receives temporary key Da and effective zone information Dd, then proceeds to step S302, and generates operation plan request De. In step S303, the automobile 300 transmits operation plan request De to the parking place server apparatus 400.

The parking place server apparatus 400 receives password Df in step S404, receives operation plan request De in step S405, and then proceeds to step S406 to generate operation plan Dg. In step S407, the parking place server apparatus 400 transmits operation plan Dg and password Df to the automobile 300. In step S304, the automobile 300 receives operation plan Dg and password Df and then proceeds to step S305 to verify whether the combination of temporary key Da and password Df is effective. If the verification result shows that the combination is effective, the automobile 300 uses password Df to unlock temporary key Da.

If the verification result shows that the combination of temporary key Da and password Df is ineffective, the automobile 300 transmits an error message to the terminal device 200 and notifies the user that temporary key Da cannot be unlocked and, therefore, AVP is unavailable. Thus, the whole process in the AVP system 100 terminates.

In step S306, the automobile 300 collates operation plan Dg with effective zone information Dd to determine whether the route included in operation plan Dg belongs to the travelable range. When it is determined that all routes included in operation plan Dg belong to the range of the effective zone, namely, the travelable range, the automobile 300 determines operation plan Dg to be usable, then proceeds to step S307 to start the automatic operation control according to operation plan Dg.

When it is determined that at least part of the routes included in operation plan Dg exceeds the range of the effective zone, namely, the travelable range, the automobile 300 determines operation plan Dg to be unusable. In this case, the automobile 300 transmits an error message to the terminal device 200 and notifies the user that operation plan Dg is unavailable and, therefore, AVP is unavailable. Thus, the whole process in the AVP system 100 terminates.

As above, the AVP system 100 according to the present embodiment allows the vehicle manufacturer server apparatus 500 and the automobile 300 to directly exchange the temporary key as a digital key for the automobile 300. The temporary key is not given to the parking place server apparatus 400. Even if a malicious third party hacks the parking place server apparatus 400, it is impossible to acquire the temporary key or decipher the workings of the digital key for the automobile 300. The present embodiment provides an excellent effect of being able to improve the confidentiality of the workings of the digital key for the automobile 300 and therefore improve the system security.

When generating the temporary key, the vehicle manufacturer server apparatus 500 also generates a password to validate the temporary key. The automobile 300 receives the temporary key and the password and then performs the automatic operation control according to the operation plan. In this case, the authorization to operate the automobile 300 is not given until both the temporary key and the password are given. The vehicle manufacturer server apparatus 500 directly transmits the temporary key to the automobile 300 and indirectly transmits the password via the parking place server apparatus 400.

Thus, the temporary key and the password are transmitted via different paths, making it possible to decrease a possibility where a malicious third party hacks both the temporary key and the password. Even if one of the temporary key and the password is hacked, it is impossible to decipher the workings of the digital key for the automobile 300 or provide the hacking third party with the authorization to operate the automobile 300. Therefore, it is possible to reliably prevent a worst-case scenario where the automobile 300 is guided outside a parking place despite the users intentions and is stolen.

The parking place server apparatus 400 transmits a set of the generated operation plan and password to the automobile 300. When the automobile 300 can normally unlock the temporary key by using the password transmitted from the parking place server apparatus 400, the automobile can determine that the operation plan received with the password is also authentic or is duly transmitted from the parking place server apparatus 400.

Even if a malicious third party such as a hacker transmits a false operation plan, the automobile 300 can determine that the operation plan is false and is unusable because the correct password is not attached. Even if a malicious third party generates and transmits a questionable operation plan (such as intentionally guiding the automobile 300 outside a parking place), the automobile 300 according to the present embodiment does not perform the automatic operation control according to the questionable operation plan (i.e., an improper drive plan), making it possible to reliably maintain the system security.

The AVP system 100 according to the present embodiment includes the map server apparatus 600 including the effective stall information retrieval portion 603 that acquires effective zone information Dd as information about the effective zone for temporary key Da. The effective stall information retrieval portion 603 receives zone information request Di transmitted from the vehicle manufacturer server apparatus 500 to acquire effective zone information Dd and transmits effective zone information Dd to the vehicle manufacturer server apparatus 500.

The automobile 300 determines whether operation plan Dg is usable in consideration of the result of collating operation plan Dg transmitted from the parking place server apparatus 400 and effective zone information Dd transmitted from the vehicle manufacturer server apparatus 500. This configuration makes it possible to decrease a possibility where the automatic operation control is performed according to questionable operation plan Dg (such as a plan including a track leading to the outside of a parking place). As a result, the system security further improves.

Second Embodiment

Figure 5:
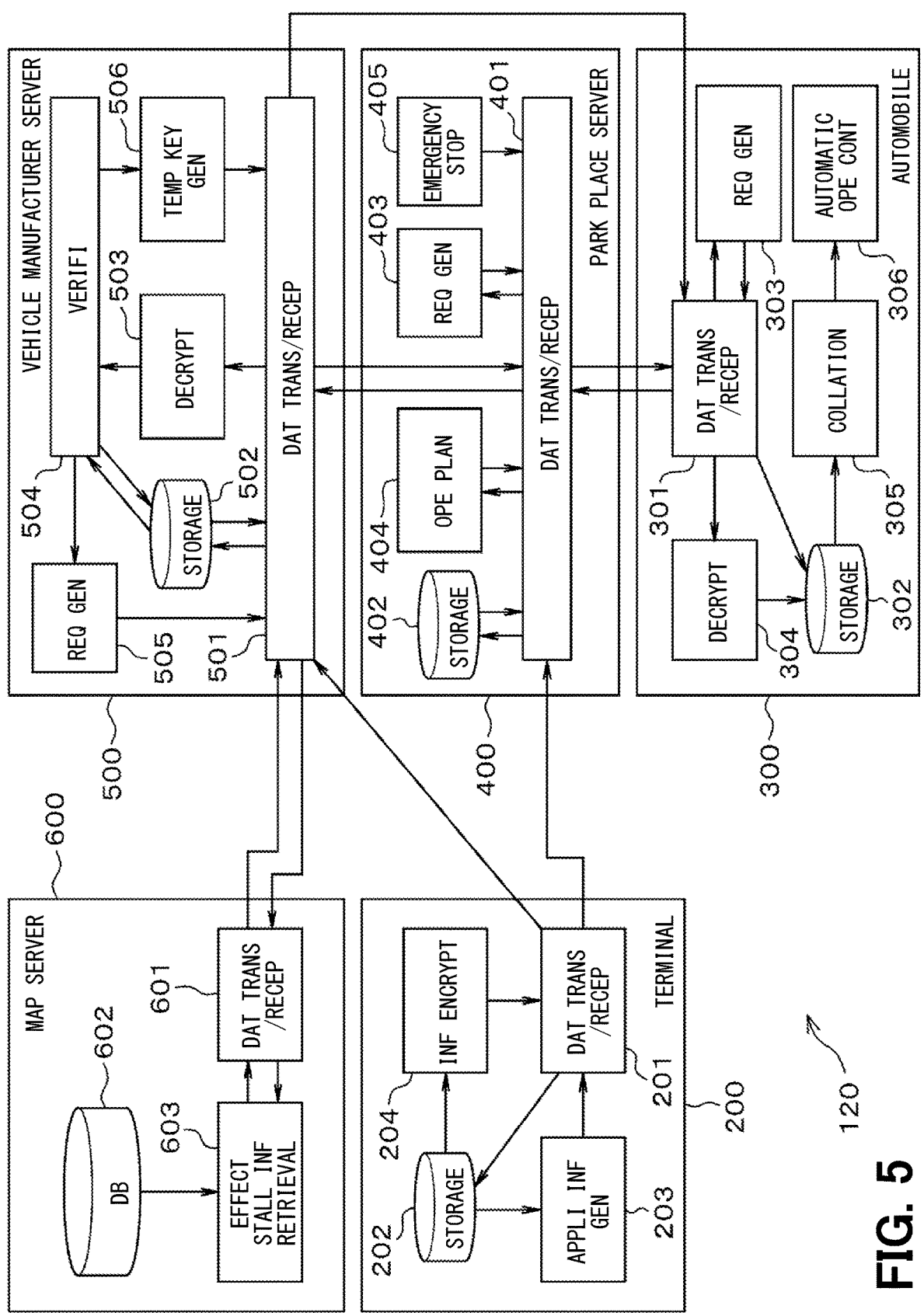
FIG. 5 is a drawing schematically illustrating the detailed configuration of each part of the automatic valet parking system according to a second embodiment.
Figure 6:
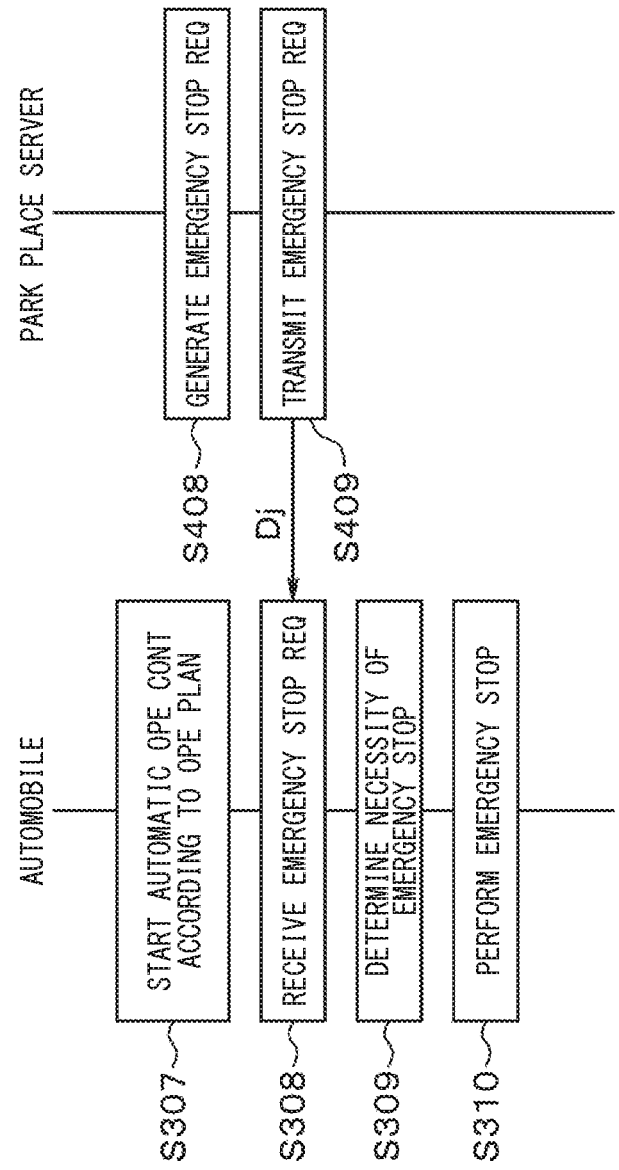
FIG. 6 is a drawing as part 1 of 2 illustrating a process flow of each part when the automatic valet parking according to the second embodiment is performed.
Figure 7:
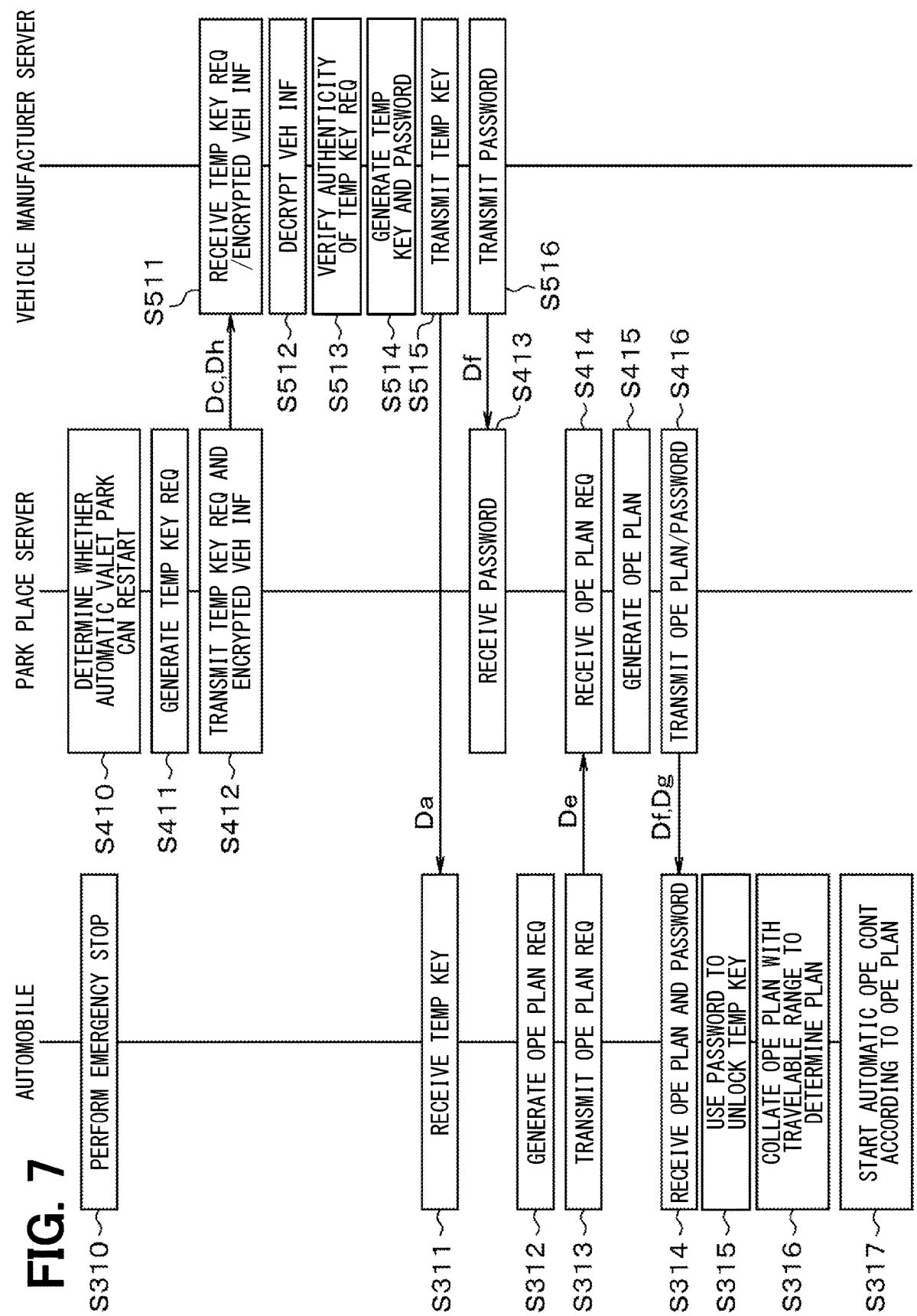
FIG. 7 is a drawing as part 2 of 2 illustrating a process flow of each part when the automatic valet parking according to the second embodiment is performed.

With reference to FIGS. 5 through 7, the description below explains a second embodiment that changes the detailed configuration of the devices in the first embodiment. Similar changes can be made to a third embodiment to be described.

As illustrated in FIG. 5, the parking place server apparatus 400 in an AVP system 120 according to the present embodiment differs from the parking place server apparatus 400 according to the first embodiment illustrated in FIG. 2 mainly in that an emergency stop portion 405 is added.

The emergency stop portion 405 generates emergency stop request Dj and transmits emergency stop request Dj to each automobile via the data transmission/reception portion 401. Emergency stop request Dj brings all traveling automobiles including the automobile 300 in a parking place to an emergency stop. Emergency stop request Dj is generated triggered by the occurrence of a situation disabling the normal execution of AVP such as in a case where a pedestrian is detected to enter an area inhibiting entry of pedestrians during a disaster or the parking place server apparatus 400 is powered off.

When the cause of the emergency stop is solved after emergency stop request Dj is transmitted, the emergency stop portion 405 directs the request generating portion 403 to regenerate temporary key request Dh. As will be described in detail later, various types of processes are performed triggered by regeneration of temporary key request Dh, thus releasing the automobile 300 from the emergency stop state to restart the AVP. As above, according to the present embodiment, a system at the parking place automatically determines instructions on the generation of emergency stop request Dj and the regeneration of temporary key request Dh. However, an administrator of the parking place may determine the instructions, for example.

The description below explains operations of the above-described configuration.

For example, FIGS. 6 and 7 illustrate processing details of each portion when the AVP system 120 according to the present embodiment performs AVP.

Flow of Process from Starting Automatic Operation to Performing Emergency Stop

FIG. 6 illustrates the contents of the process from starting the automatic operation to performing the emergency stop. As illustrated in FIG. 6, in step S408, the parking place server apparatus 400 generates emergency stop request Dj triggered by the occurrence of the above-described situations.

In step S409, the parking place server apparatus 400 transmits generated emergency stop request Dj to the automobile 300. In step S307, the automobile 300 starts the automatic operation control according to operation plan Dg. In step S308, the automobile 300 receives emergency stop request Dj transmitted from the parking place server apparatus 400 and then proceeds to step S309. In step S309, the automobile 300 determines whether the emergency stop is needed.

If the emergency stop is determined to be necessary, the automobile 300 proceeds to step S310 and performs the emergency stop. In this case, the automobile 300 has a function such as the precrash safety system that automatically operates the brake before the collision with an obstacle existing ahead. Even when a preceding automobile is performing the AVP and comes to an emergency stop, the succeeding automobile does not collide with the preceding automobile.

Flow of Process from Performing Emergency Stop to Restarting Automatic Operation FIG. 7 illustrates the contents of the process from performing the emergency stop to restarting the automatic operation. As illustrated in FIG. 7, the parking place server apparatus 400 transmits emergency stop request Dj and then, in step S410, determines whether the AVP can restart. When the parking place server apparatus 400 determines that the cause of the emergency stop is solved and the AVP can restart, the parking place server apparatus 400 proceeds to step S411 and regenerates temporary key request Dh.

In step S412, the parking place server apparatus 400 transmits temporary key request Dh and encrypted vehicle information Dc to the vehicle manufacturer server apparatus 500. Vehicle information Dc transmitted from the terminal device 200 is stored in the storage portion 402 of the parking place server apparatus 400 until the unloading is complete. In step S412, the parking place server apparatus 400 reads vehicle information Dc stored in the storage portion 402 and then transmits vehicle information Dc.

In step S511, the vehicle manufacturer server apparatus 500 receives temporary key request Dh and encrypted vehicle information Dc and then proceeds to step S512 to decrypt vehicle information Dc. In step S513, the vehicle manufacturer server apparatus 500 verifies whether temporary key request Dh is authentic. The authentication information transmitted from the terminal device 200, namely, application information db and vehicle information Dc, are stored in the storage portion 502 of the vehicle manufacturer server apparatus 500 until the loading is complete. In step S513, the vehicle manufacturer server apparatus 500 reads the authentication information stored in the storage portion 502 and then verifies whether temporary key request Dh is authentic.

The vehicle manufacturer server apparatus 500 performs the process in step S514 and later only if temporary key request Dh is determined to be authentic. The process similar to that described in the first embodiment is performed if temporary key request Dh is determined to be unauthentic. In step S514, the vehicle manufacturer server apparatus 500 generates temporary key Da and password Df.

In this case, the vehicle manufacturer server apparatus 500 need not transmit effective zone information Dd to the automobile 300 and therefore does not exchange data with the map server apparatus 600.

In step S515, the vehicle manufacturer server apparatus 500 transmits temporary key Da to the automobile 300. In step S516, the vehicle manufacturer server apparatus 500 transmits password Df to the parking place server apparatus 400. The automobile 300 performs the emergency stop in step S310, receives temporary key Da in step S311, and then proceeds to step S312 to generate operation plan request De.

In step S313, the automobile 300 transmits operation plan request De to the parking place server apparatus 400. The parking place server apparatus 400 receives password Df in step S413, receives operation plan request De in step S414, and then proceeds to step S415 to generate operation plan Dg. In step S416, the parking place server apparatus 400 transmits operation plan Dg and password Df to the automobile 300.

The automobile 300 receives operation plan Dg and password Df in step S314 and then proceeds to step S315 to determine whether the combination of temporary key Da and password Df is effective. If the verification result shows that the combination is effective, the automobile 300 uses password Df to unlock temporary key Da. The process similar to that described in the first embodiment is performed if the verification result shows that the combination of temporary key Da and password Df is ineffective. In step S316, the automobile 300 collates operation plan Dg and effective zone information Dd and determines whether the route included in operation plan Dg belongs to the travelable range.

Effective zone information Dd transmitted from the vehicle manufacturer server apparatus 500 is stored in the storage portion 302 of the automobile 300 until the unloading is complete. In step S316, the automobile 300 reads effective zone information Dd stored in the storage portion 302 and then collates operation plan Dg and effective zone information Dd. If the collation result shows that operation plan Dg is determined to be usable, the automobile 300 proceeds to step S317 and restarts the automatic operation control according to operation plan Dg. The process similar to that described in the first embodiment is performed if operation plan Dg is determined to be unusable.

The above-described present embodiment provides the following effect.

For example, all automobiles in the parking place need to be stopped immediately on the occurrence of a situation disabling the normal execution of AVP such as in a case where a pedestrian is detected to enter an area inhibiting entry of pedestrians during a disaster or the parking place server apparatus 400 is powered off. When such a situation occurs, the present embodiment allows the parking place server apparatus 400 to directly transmit emergency stop request Dj to the automobile 300 without the need for the authentication using temporary key Da and password Df. The automobile 300 can stop immediately.

However, when the cause of the emergency stop is solved to restart the AVP, there may be a risk of hacking if the parking place server apparatus 400 directly transmits an instruction to the automobile 300 so that the emergency stop state is released to restart the automatic operation. To restart the automatic operation, the present embodiment performs the authentication using temporary key Da and password Df in a manner similar to each process performed when the automatic operation starts for the first time. This makes it possible to decrease the possibility of hacking by a malicious third party when the automatic operation restarts.

A user is highly likely to leave the parking place after applying for the AVP by using the terminal device 200. After the automobile 300 starts the automatic operation control, the automobile 300, the parking place server apparatus 400, and the vehicle manufacturer server apparatus 500 are highly likely to be incapable of communicating with the terminal device 200. As a solution, the automobile 300, the parking place server apparatus 400, and the vehicle manufacturer server apparatus 500 store various types of information (such as application information db and vehicle information Dc) transmitted from the terminal device 200 in the storage portions 302, 402, and 502.

When the automatic operation restarts after the emergency stop, the automobile 300, the parking place server apparatus 400, and the vehicle manufacturer server apparatus 500 can perform a process similar to each process performed when the automatic operation starts for the first time, without the need for the terminal device 200 to retransmit various types of information. Various types of information remain stored in the storage portions 302, 402, and 502 until the AVP service (loading or unloading) is complete. After the service is complete, the information is automatically erased at a specified timing. This can prevent a leak of personal information, for example, contained in application information db or vehicle information Dc.

Third Embodiment

Figure 8:
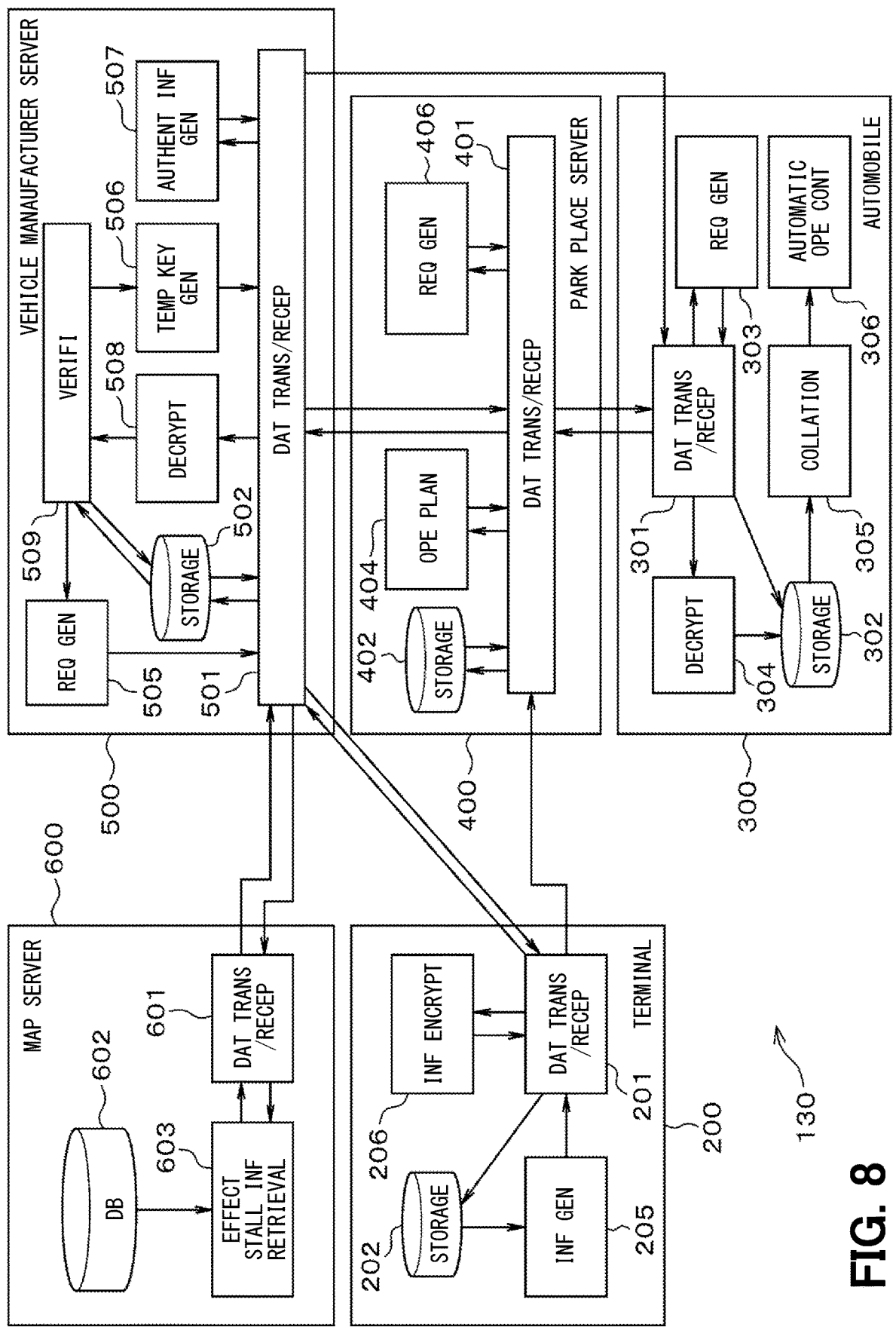
FIG. 8 is a drawing schematically illustrating the detailed configuration of each part of the automatic valet parking system according to a third embodiment.
Figure 9:
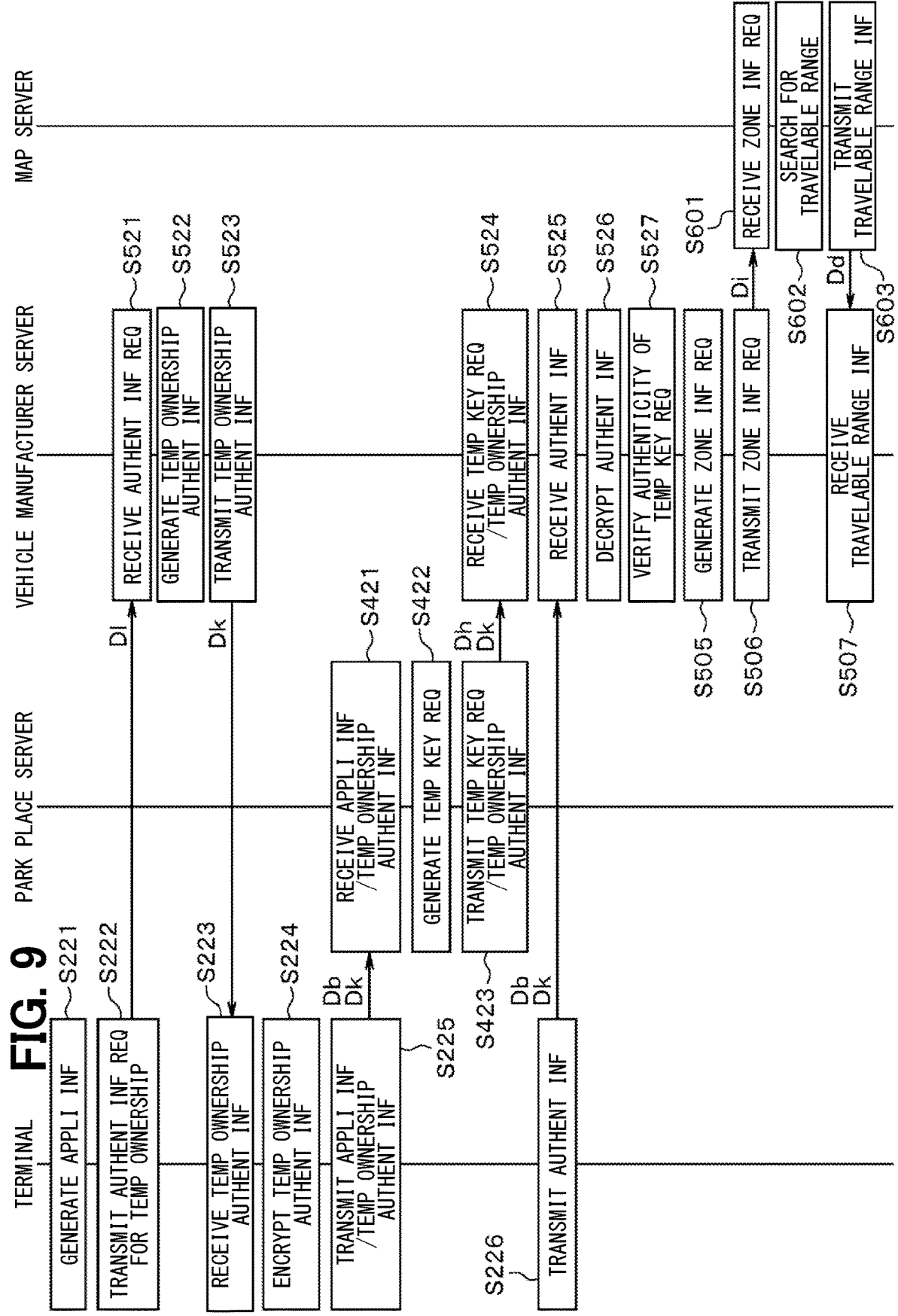
FIG. 9 is a drawing illustrating a process flow of each part when the automatic valet parking according to the third embodiment is performed.

With reference to FIGS. 8 and 9, the description below explains the third embodiment that changes the detailed configuration of the devices in the first embodiment.

As illustrated in FIG. 8, the terminal device 200 in an AVP system 130 according to the present embodiment differs from the terminal device 200 according to the first embodiment illustrated in FIG. 2 mainly in that an information generating portion (i.e., an application information generator) 205 replaces the application information generating portion 203 and an information encrypting portion 206 replaces the information encrypting portion 204.

In this case, the automobile 300 represents a rental car or a shared car, not a car owned by the user who owns the terminal device 200. Therefore, the terminal device 200 does not store vehicle information Dc. When performing the AVP by using the automobile 300, the user needs to request the authentication information about the right to temporarily own the automobile 300 from the vehicle manufacturer server apparatus 500.

Like the application information generating portion 203, the information generating portion 205 generates application information db and generates authentication information request Dl to request the generation of temporary ownership authentication information Dk. The information generating portion 205 transmits generated authentication information request Dl to the vehicle manufacturer server apparatus 500 via the data transmission/reception portion 201. The information encrypting portion 206 receives temporary ownership authentication information Dk transmitted from the vehicle manufacturer server apparatus 500 via the data transmission/reception portion 201 and then encrypts temporary ownership authentication information Dk.

The information encrypting portion 206 encrypts temporary ownership authentication information Dk including information about the user of the terminal device 200. The information encrypting portion 206 transmits encrypted temporary ownership authentication information Dk to the parking place server apparatus 400 and the vehicle manufacturer server apparatus 500 via the data transmission/reception portion 201. In the description below, temporary ownership authentication information Dk may be shortened to authentication information Dk.

In this case, application information db and temporary ownership authentication information Dk are simultaneously transmitted to the parking place server apparatus 400. Application information db and authentication information Dk are simultaneously transmitted to the vehicle manufacturer server apparatus 500. In the description below, application information db and authentication information Dk transmitted to the vehicle manufacturer server apparatus 500 may be collectively described as the authentication information.

The parking place server apparatus 400 according to the present embodiment differs from the parking place server apparatus 400 according to the first embodiment illustrated in FIG. 2 mainly in that a request generating portion (i.e., a key request generator) 406 replaces the request generating portion 403. The request generating portion 406 receives application information db and authentication information Dk transmitted from the terminal device 200 via the data transmission/reception portion 401 and then generates temporary key request Dh. The request generating portion 406 functions as a key request generating portion. The request generating portion 406 transmits generated temporary key request Dh and encrypted authentication information Dk to the vehicle manufacturer server apparatus 500 via the data transmission/reception portion 401.

The vehicle manufacturer server apparatus 500 according to the present embodiment differs from the vehicle manufacturer server apparatus 500 according to the first embodiment illustrated in FIG. 2 mainly in that an authentication information generating portion 507 is added, a decryption portion 508 replaces the decryption portion 503, and a verification portion 509 replaces the verification portion 504. The authentication information generating portion 507 receives authentication information request DI transmitted from the terminal device 200 via the data transmission/reception portion 501 and then generates temporary ownership authentication information Dk.

Temporary ownership authentication information Dk mainly includes the vehicle information about the automobile 300 and information that associates a user ID corresponding to the user applying for the AVP with an available time slot during which the user can use the automobile 300. When a specified expiration date expires, for example, temporary ownership authentication information Dk is invalidated and is unusable. The authentication information generating portion 507 transmits generated temporary ownership authentication information Dk to the terminal device 200 via the data transmission/reception portion 501.

The decryption portion 508 receives encrypted authentication information Dk transmitted from the terminal device 200 via the data transmission/reception portion 501 and then decrypts authentication information Dk. The decryption portion 508 receives encrypted authentication information Dk transmitted from the parking place server apparatus 400 via the data transmission/reception portion 501 and then decrypts authentication information Dk. the verification portion 509 receives application information db and authentication information Dk transmitted from the terminal device 200 via the data transmission/reception portion 501, receives temporary key request Dh transmitted from the parking place server apparatus 400 via the data transmission/reception portion 501, and then verifies the authenticity of temporary key request Dh. The verification portion 509 functions as a key request verification portion.

Specifically, the verification portion 509 verifies the information transmitted from the terminal device 200 and the parking place server apparatus 400 and thereby verifies the authenticity of temporary key request Dh as follows. The verification portion 509 determines whether there is a match between the vehicle information contained in authentication information Dk transmitted from the terminal device 200 and the vehicle information contained in authentication information Dk transmitted from the parking place server apparatus 400.

The verification portion 509 determines whether there is a match between the parking place as where to apply included in application information db transmitted from the terminal device 200 and the parking place provided with the parking place server apparatus 400 as an origin of transmitting temporary key request Dh, namely, whether the parking place information matches. If vehicle information matches and the parking place information matches, the verification portion 509 determines that temporary key request Dh is authentic. If either or both of vehicle information and the parking place information do not match, the verification portion 509 determines that temporary key request Dh is unauthentic.

Originally, the authentication information generating portion 507 of the vehicle manufacturer server apparatus 500 generates authentication information Dk. Therefore, the verification portion 509 can previously acquire the vehicle information contained in authentication information Dk. The verification portion 509 may determine a match between the vehicle information including the vehicle information previously acquired from the authentication information generating portion 507. In this case, the verification portion 509 may determine a match among all the three pieces of vehicle information or may determine a match between any two of the three pieces of vehicle information.

The description below explains operations of the above-described configuration.

FIG. 9 illustrates the contents of the process from applying for the AVP to receiving a travelable range according to the present embodiment. The process from mainly generating the temporary key to starting the automatic operation is similar to the process according to the first embodiment illustrated in FIG. 4 and a description is omitted for simplicity. When a user manipulation applies for valet parking, in step S221, the terminal device 200 recognizes the application manipulation and generates application information db and authentication information request DI according to the contents of the manipulation.

In step S222, the terminal device 200 transmits authentication information request DI to the vehicle manufacturer server apparatus 500. In step S521, the vehicle manufacturer server apparatus 500 receives authentication information request DI and then proceeds to step S522 to generate temporary ownership authentication information Dk. In step S523, the vehicle manufacturer server apparatus 500 transmits temporary ownership authentication information Dk to the terminal device 200.

In step S223, the terminal device 200 receives temporary ownership authentication information Dk and then proceeds to step S224 to encrypt temporary ownership authentication information Dk. In step S225, the terminal device 200 transmits application information db and encrypted temporary ownership authentication information Dk to the parking place server apparatus 400. In step S226, the terminal device 200 transmits application information db and encrypted temporary ownership authentication information Dk, namely, the authentication information about the valet parking application to the vehicle manufacturer server apparatus 500.

In step S421, the parking place server apparatus 400 receives application information db and encrypted temporary ownership authentication information Dk and then proceeds to step S422 to generate temporary key request Dh. In step S423, the parking place server apparatus 400 transmits temporary key request Dh and encrypted temporary ownership authentication information Dk to the vehicle manufacturer server apparatus 500. According to the present embodiment, the vehicle manufacturer server apparatus 500 can decrypt temporary ownership authentication information Dk encrypted by the terminal device 200, but the parking place server apparatus 400 cannot. Therefore, the parking place server apparatus 400 cannot identify the contents of authentication information Dk containing personal information, for example, transmitted from the terminal device 200.

In step S524, the vehicle manufacturer server apparatus 500 receives temporary key request Dh and encrypted temporary ownership authentication information Dk, receives the authentication information in step S525, and then proceeds to step S526 to decrypt authentication information Dk. In step S527, the vehicle manufacturer server apparatus 500 verifies whether temporary key request Dh is authentic. The vehicle manufacturer server apparatus 500 performs the process in step S505 and later only if temporary key request Dh is determined to be authentic.

The process described in the first embodiment is applicable to the process performed when temporary key request Dh is determined to be unauthentic. The process described in the first embodiment is also applicable to the process in step S505 and later, namely, the process (steps S505 through S507) performed by the vehicle manufacturer server apparatus 500 and the process (steps S601 through S603) performed by the map server apparatus 600.

As above, the present embodiment assumes a system in which the automobile 300 represents a rental car or a shared car, not a car owned by the user who owns the terminal device 200. Like the first embodiment, the present embodiment also allows the vehicle manufacturer server apparatus 500 and the automobile 300 to directly exchange the temporary key as a digital key for the automobile 300. The temporary key is not given to the parking place server apparatus 400. Therefore, the present embodiment provides an effect similar to the first embodiment.

Fourth Embodiment

Figure 10:
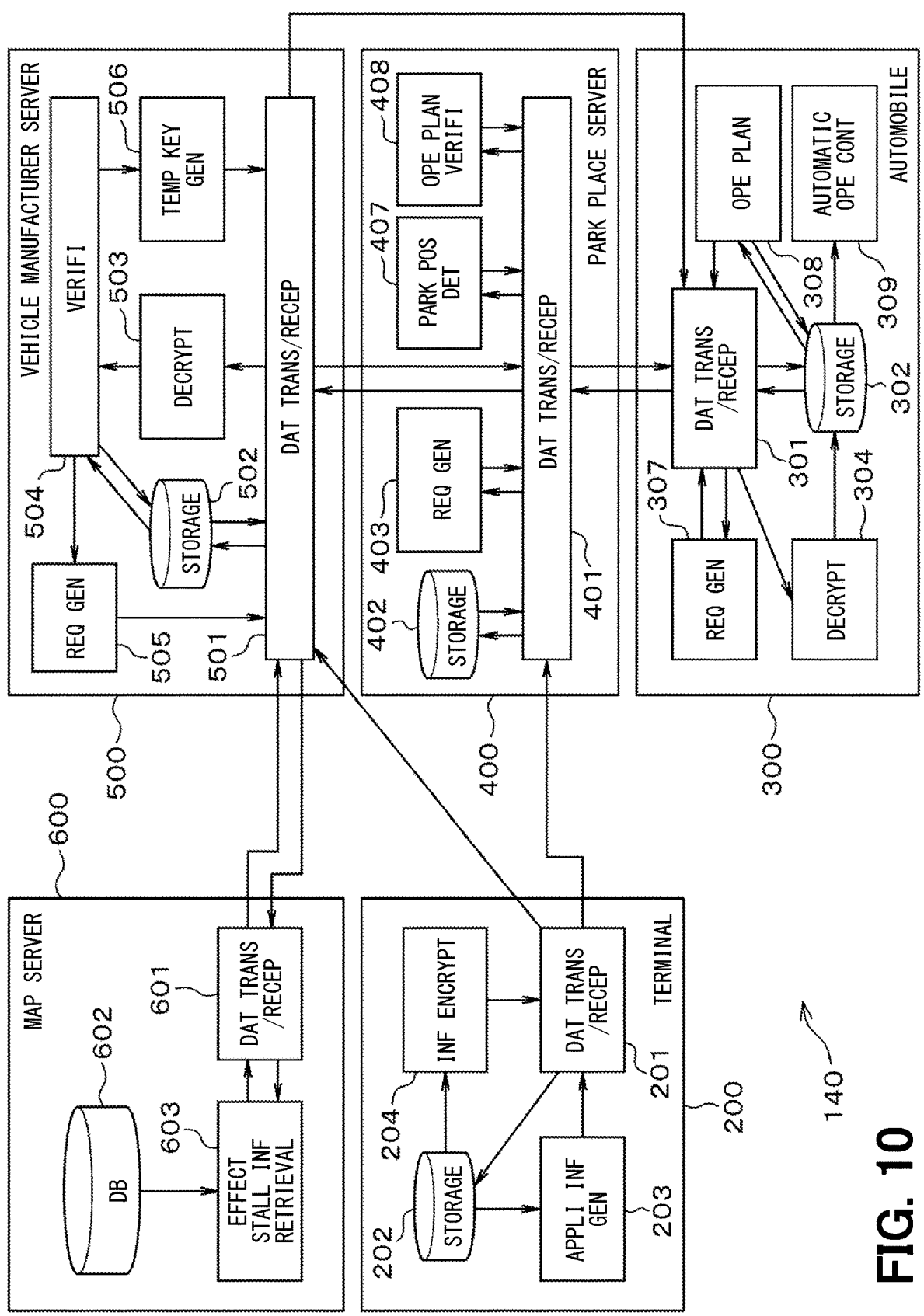
FIG. 10 is a drawing schematically illustrating the detailed configuration of each part of the automatic valet parking system according to a fourth embodiment.
Figure 11:
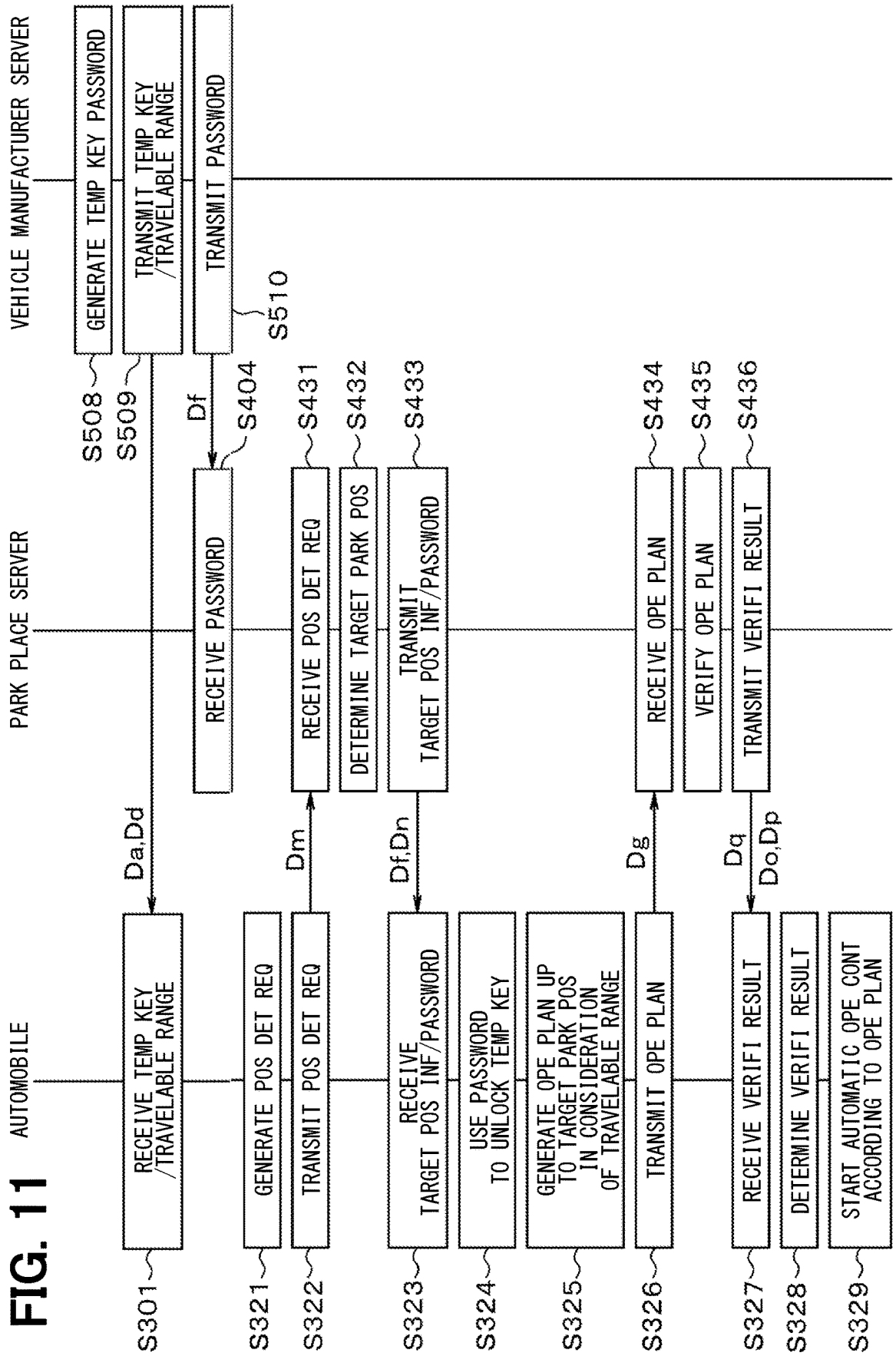
FIG. 11 is a drawing illustrating a process flow of each part when the automatic valet parking according to the fourth embodiment is performed.

With reference to FIGS. 10 and 11, the description below explains a fourth embodiment that changes the detailed configuration of the devices in the first embodiment. Similar changes can be made to the third embodiment.

As illustrated in FIG. 10, the automobile 300 in an AVP system 140 according to the present embodiment differs from the automobile 300 according to the first embodiment illustrated in FIG. 2 mainly in that a request generating portion 307 replaces the request generating portion 303, an operation planning portion (i.e., a drive planning portion) 308 is added, and an automatic operation control portion (i.e., an autonomous driving controller) 309 replaces the automatic operation control portion 306.

The request generating portion 307 receives temporary key Da and effective zone information Dd transmitted from the vehicle manufacturer server apparatus 500 via the data transmission/reception portion 301 and then generates position determination request Dm that requests the determination of a targeted parking position. The request generating portion 307 transmits generated position determination request Dm to the parking place server apparatus 400 via the data transmission/reception portion 301. The operation planning portion 308 receives target position information Dn transmitted from the parking place server apparatus 400 via the data transmission/reception portion 301. Besides, the operation planning portion 308 generates operation plan Dg based on target position information Dn when the verification result from the decryption portion 304 shows that the combination of temporary key Da and password Df is effective. The description later explains how the parking place server apparatus 400 transmits target position information Dn.

In this case, the operation planning portion 308 receives effective zone information Dd transmitted from the vehicle manufacturer server apparatus 500 and then generates operation plan Dg in consideration of effective zone information Dd. The operation planning portion 308 transmits generated operation plan Dg to the parking place server apparatus 400 via the data transmission/reception portion 301. The operation planning portion 308 receives correction information Do and unavailability information Dp transmitted from the parking place server apparatus 400 via the data transmission/reception portion 301 and then regenerates operation plan Dg based on correction information Do. The description later explains how the parking place server apparatus 400 transmits correction information Do and unavailability information Dp. The operation planning portion 308 also transmits regenerated operation plan Dg to the parking place server apparatus 400 via the data transmission/reception portion 301.

The automatic operation control portion 309 receives availability information Dq transmitted from the parking place server apparatus 400 via the data transmission/reception portion 301 and then performs the automatic operation control according to operation plan Dg generated by the operation planning portion 308. The description later explains how the parking place server apparatus 400 transmits availability information Dq.

The parking place server apparatus 400 according to the present embodiment differs from the parking place server apparatus 400 according to the first embodiment illustrated in FIG. 2 mainly in that the operation planning portion (i.e., a drive planning portion) 404 is omitted and a parking position determination portion 407 and an operation plan verification portion 408 are added. The parking position determination portion 407 receives password Df transmitted from the vehicle manufacturer server apparatus 500 via the data transmission/reception portion 401, receives position determination request Dm transmitted from the automobile 300, and then determines a targeted parking position for the automobile 300.

The parking position determination portion 407 transmits password Df along with target position information Dn as the information about the targeted parking position to the automobile 300 via the data transmission/reception portion 401. Each process performed by the parking position determination portion 407 is comparable to a parking position determination procedure. Target position information Dn contains map information about the parking place in addition to the targeted parking position representing a specified parking slot, for example.

The operation plan verification portion 408 receives operation plan Dg transmitted from the automobile 300 via the data transmission/reception portion 401 and then verifies whether operation plan Dg is questionable (i.e., improper). The operation plan verification portion 408 is comparable to a plan verification portion. If operation plan Dg is unquestionable (i.e., proper), the operation plan verification portion 408 transmits availability information Dq representing operation plan Dg as available to the automobile 300 via the data transmission/reception portion 401.

If operation plan Dg is questionable, the operation plan verification portion 408 generates correction information Do as the information about the correction of operation plan Dg. The operation plan verification portion 408 transmits correction information Do and unavailability information Dp representing operation plan Dg as unavailable to the automobile 300 via the data transmission/reception portion 401. Each process performed by the operation plan verification portion 408 is comparable to a plan verification procedure.

Specifically, the operation plan verification portion 408 can use the following technique to verify operation plan Dg. The operation plan verification portion 408 determines operation plan Dg to be unquestionable when satisfying a first condition that the plan prevents the automobile 300 from being guided outside the parking place. Operation plan Dg satisfying the first condition can prevent a worst-case scenario where a malicious third party steals the automobile 300 by hacking it to be guided outside the parking place despite the user's intentions, for example.

The operation plan verification portion 408 may determine operation plan Dg to be unquestionable when satisfying a second condition in addition to the first condition. The second condition states that the plan takes effect up to a correct target position. Specifically, the second condition may require that an error between the target position of the automobile 300 in operation plan Dg and the targeted parking position represented by target position information Dn is smaller than a specified threshold value error. The threshold value error may be set to a value corresponding to various capabilities of the parking place server apparatus 400. Operation plan Dg satisfying the second condition can prevent an adverse effect on the parking slot management conducted by the parking place server apparatus 400.

The operation plan verification portion 408 may determine operation plan Dg to be unquestionable when satisfying a third condition in addition to the first condition or in addition to the first condition and the second condition. The third condition states that the travel direction of the automobile 300 in operation plan Dg corresponds to the travel direction specified in the parking place. A plurality of automobiles are highly likely to travel at the same time slot in the parking place. In such a situation, when the automobile 300 does not travel in the specified travel direction, causing wrong-way travel, and thereby the safety deteriorates. Operation plan Dg satisfying the third condition can restrain the safety from deteriorating due to the wrong-way travel, for example The third condition may accept an approximate match between the travel direction and the specified travel direction. However, the condition may determine whether the automobile 300 travels an unquestionable track in a detailed direction. The operation plan verification portion 408 may determine operation plan Dg to be unquestionable when operation plan Dg allows the automobile 300 to travel a track that is free from the collision with a pillar or another parked automobile in the parking place. Such a determination may be provided as needed depending on various capabilities of the parking place server apparatus 400.

The operation plan verification portion 408 can generate correction information Do by using one of the following two specific techniques. A first generation technique generates correction information Do represented by a specific instruction on how to correct part of operation plan Dg. Specifically, the first generation technique generates correction information Do represented by the information that associates an issue in operation plan Dg with the method of solving the issue. The first generation technique enables the automobile 300 to recognize an issue and the method of solving the issue and then regenerate operation plan Dg. The first generation technique can regenerate unquestionable operation plan Dg based on a decreased number of corrections, making it possible to reduce processing loads on the automobile 300.

A second generation technique generates correction information Do represented by information instructing that operation plan Dg is questionable and the plan is recreated anew from the beginning. The second generation technique eliminates the need to create a method of solving an issue, making it possible to reduce processing loads on the parking place server apparatus 400. When operation plan Dg is created to direct the same target position, depending on a technique or an algorithm to generate operation plan Dg, the plan does not necessarily propose the same route but is highly likely to propose different routes each time the plan is fulfilled.

The issue may be solved by simply recreating the plan from the beginning. The first occurring issue may result from a bug. The bug may be solved by regenerating the plan. Then, it is possible to create an unquestionable operation plan Dg. Eventually, an unquestionable operation plan is generated even when operation plan Dg is regenerated based on correction information Do generated by the second generation technique.

The description below explains operations of the above-described configuration.

FIG. 11 illustrates the contents of the process from mainly generating the temporary key to starting the automatic operation according to the present embodiment. The process from applying for the AVP to receiving a travelable range is similar to the process according to the first embodiment illustrated in FIG. 3 and a description is omitted for simplicity.

Also, in FIG. 11, the process in steps S508 through S510 performed by the vehicle manufacturer server apparatus 500, in step S404 performed by the parking place server apparatus 400, and in step S301 performed by the automobile 300 is similar to the process according to the first embodiment illustrated in FIG. 4 and a description is omitted for simplicity. In this case, the automobile 300 receives temporary key Da and effective zone information Dd in step S301 and then proceeds to step S321 to generate position determination request Dm. In step S322, the automobile 300 transmits position determination request Dm to the parking place server apparatus 400.

The parking place server apparatus 400 receives password Df in step S413, receives position determination request Dm in step S431, and then proceeds to step S432 to determine the targeted parking position for the automobile 300. In step S433, the parking place server apparatus 400 transmits target position information Dn and password Df as the information about the determined targeted parking position to the automobile 300.

In step S323, the automobile 300 receives target position information Dn and password Df and then proceeds to step S324 to determine whether the combination of temporary key Da and password Df is effective. If the verification result shows that the combination is effective, the automobile 300 unlocks temporary key Da by using password Df. The process similar to that described in the first embodiment is performed if the verification result shows that the combination of temporary key Da and password Df is ineffective.

In step S325, the automobile 300 generates operation plan Dg in consideration of effective zone information Dd, namely, the travelable range for the automobile 300. In step S326, the automobile 300 transmits generated operation plan Dg to the parking place server apparatus 400. In step S434, the parking place server apparatus 400 receives operation plan Dg and then proceeds to step S435 to determine whether operation plan Dg is questionable. In step S436, the parking place server apparatus 400 transmits information about the result of verifying operation plan Dg to the automobile 300.

If the verification result shows that operation plan Dg is unquestionable, the parking place server apparatus 400 transmits availability information Dq to the automobile 300 in step S436. If the verification result shows that operation plan Dg is questionable, the parking place server apparatus 400 transmits correction information Do and unavailability information Dp to the automobile 300 in step S436. In step S327, the automobile 300 receives availability information Dq or correction information Do and unavailability information Dp and then proceeds to step S328.

In step S328, the automobile 300 determines the result of the verification on operation plan Dg performed by the parking place server apparatus 400. If availability information Dq is received, the automobile 300 determines operation plan Dg to be unquestionable. If unavailability information Dp is received, the automobile 300 determines operation plan Dg to be questionable. If operation plan Dg is determined to be unquestionable, the automobile 300 proceeds to step S329 and starts the automatic operation control according to operation plan Dg. If operation plan Dg is determined to be questionable, the automobile 300 returns to S325 and regenerates operation plan Dg.

As above, the system according to the present embodiment is mainly comprised of the automobile 300. The operation planning portion 308 included in the automobile 300 generates operation plans. But then again, like the first embodiment mainly comprised of the parking place, the present embodiment also allows the vehicle manufacturer server apparatus 500 and the automobile 300 to directly exchange the temporary key as a digital key for the automobile 300. The temporary key is not supplied to the parking place server apparatus 400. Therefore, the present embodiment provides an effect similar to the first embodiment.

In this case, the operation plan verification portion 408 included in the parking place server apparatus 400 verifies whether an operation plan generated by the operation planning portion 308 included in the automobile 300 is questionable. According to the present embodiment, the parking place server apparatus 400 provided for a parking place verifies the validity of an operation plan generated in the automobile 300 and thereby ensures the safety of the operation plan.

Fifth Embodiment

Figure 12:
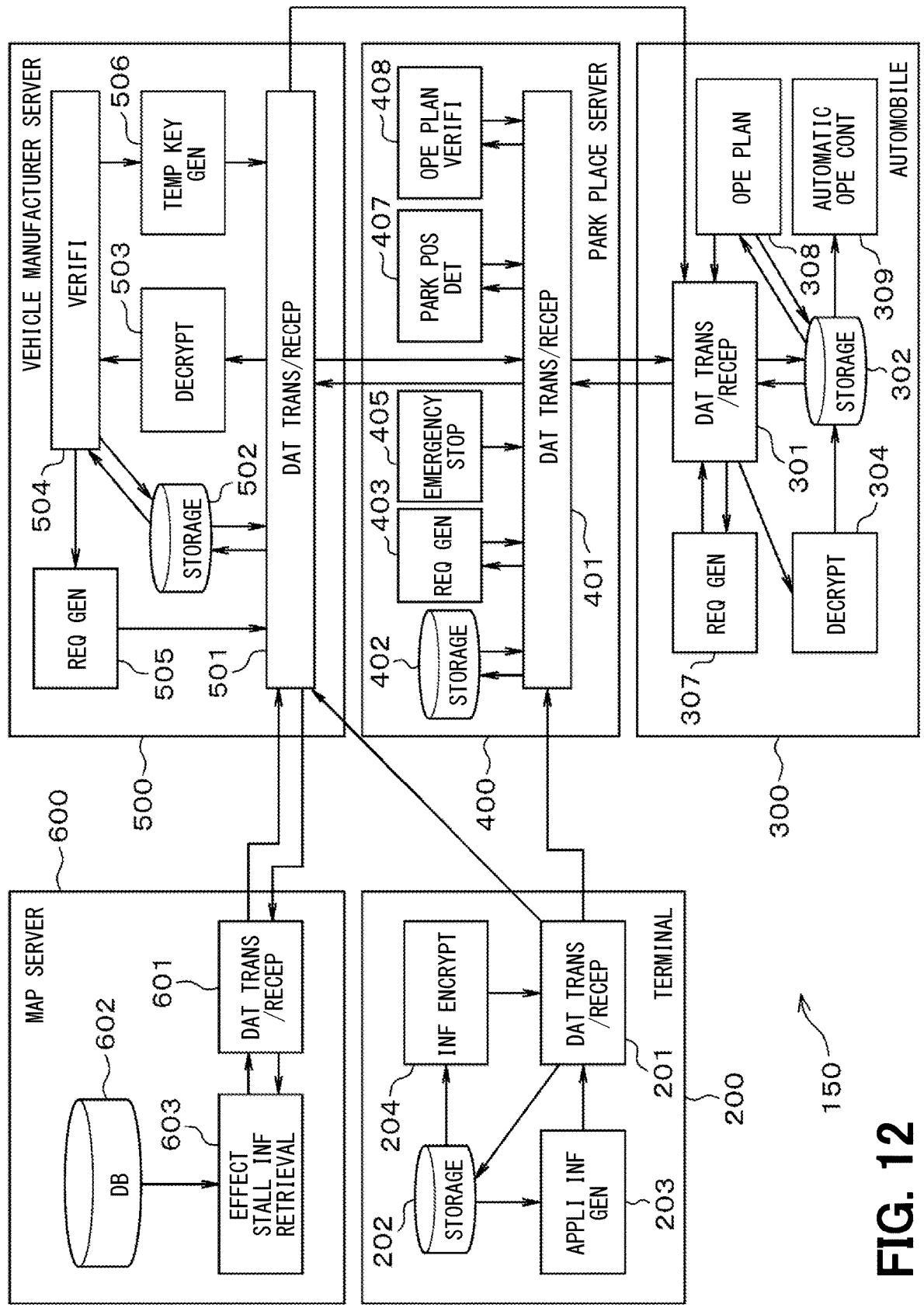
FIG. 12 is a drawing schematically illustrating the detailed configuration of each part of the automatic valet parking system according to a fifth embodiment.
Figure 13:
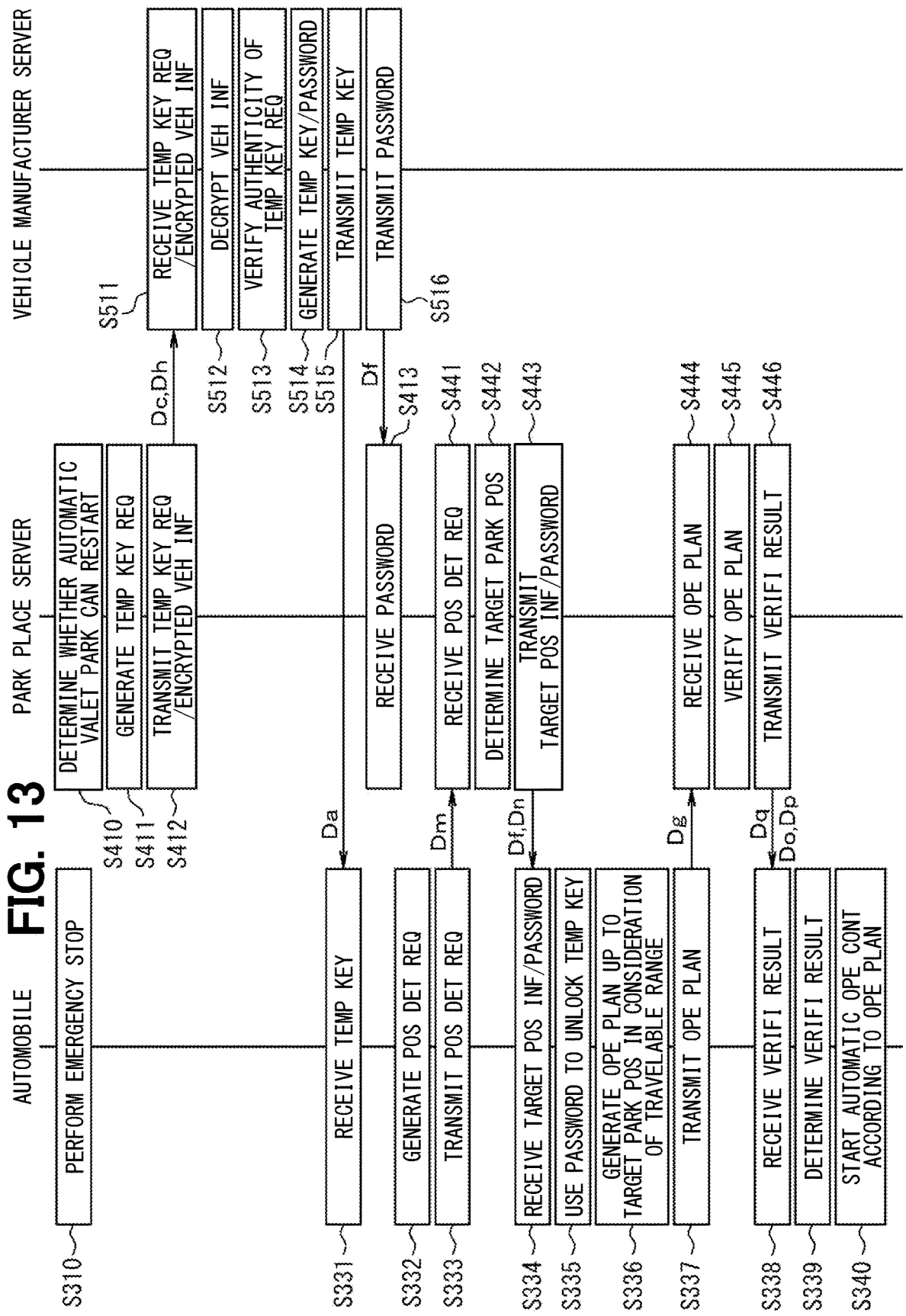
FIG. 13 is a drawing illustrating a process flow of each part when the automatic valet parking according to the fifth embodiment is performed.

With reference to FIGS. 12 and 13, the description below explains a fifth embodiment that changes the detailed configuration of the devices in the fourth embodiment.

As illustrated in FIG. 12, the parking place server apparatus 400 in an AVP system 150 according to the present embodiment differs from the parking place server apparatus 400 according to the fourth embodiment in FIG. 10 mainly in that the emergency stop portion 405 described in the second embodiment is added.

The description below explains operations of the above-described configuration.

FIG. 13 illustrates the contents of the process from performing the emergency stop to restarting the automatic operation. The process from starting the automatic operation to performing the emergency stop according to the present embodiment is similar to the process according to the second embodiment illustrated in FIG. 6 and a description is omitted for simplicity.

Also in FIG. 13, the process in steps S511 through S516 performed by the vehicle manufacturer server apparatus 500, in steps S410 through S413 performed by the parking place server apparatus 400, and in steps S310 and S331 performed by the automobile 300 is similar to the process according to the second embodiment illustrated in FIG. 7 and a description is omitted for simplicity. In this case, the automobile 300 performs the emergency stop in step S310, receives temporary key Da in step S331, and then proceeds to step S332 to generate position determination request Dm. In step S333, the automobile 300 transmits position determination request Dm to the parking place server apparatus 400.

The parking place server apparatus 400 receives password Df in step S404, receives position determination request Dm in step S441, and then proceeds to step S442 to determine the targeted parking position for the automobile 300. In step S443, the parking place server apparatus 400 transmits target position information Dn and password Df as the information about the determined targeted parking position to the automobile 300.

In step S334, the automobile 300 receives target position information Dn and password Df and then proceeds to step S335 to verify whether the combination of temporary key Da and password Df is effective. If the verification result shows that the combination is effective, the automobile 300 uses password Df to unlock temporary key Da. The process similar to that described in the first embodiment is performed if the verification result shows that the combination of temporary key Da and password Df is ineffective.

In step S336, the automobile 300 generates operation plan Dg in consideration of effective zone information Dd, namely, the travelable range for the automobile 300. Effective zone information Dd transmitted from the vehicle manufacturer server apparatus 500 is stored in the storage portion 302 of the automobile 300 until the unloading is complete. In step S336, the automobile 300 reads effective zone information Dd stored in the storage portion 302 and then generates operation plan Dg. In step S337, the automobile 300 transmits generated operation plan Dg to the parking place server apparatus 400.

In step S444, the parking place server apparatus 400 receives operation plan Dg and then proceeds to step S445. The process in step S445 and later, specifically, the process in steps S444 through S446 performed by the parking place server apparatus 400 and in steps S338 through S340 performed by the automobile 300 is similar to the process in steps S434 through S436 and S338 through S340 according to the fourth embodiment illustrated in FIG. 11.

As above, the present embodiment mainly comprised of the automobile 300 is similar to the second embodiment mainly comprised of the parking place. On the occurrence of a situation disabling the normal execution of AVP, the present embodiment also allows the parking place server apparatus 400 to directly transmit emergency stop request Dj to the automobile 300 without the need for the authentication using temporary key Da and password Df. The automobile 300 can stop immediately.

To restart the automatic operation, the present embodiment, similar to the second embodiment, performs the authentication using temporary key Da and password Df. This makes it possible to decrease the possibility of hacking by a malicious third party when the automatic operation restarts. Therefore, the present embodiment provides an effect similar to the second embodiment.

Sixth Embodiment

Figure 14:
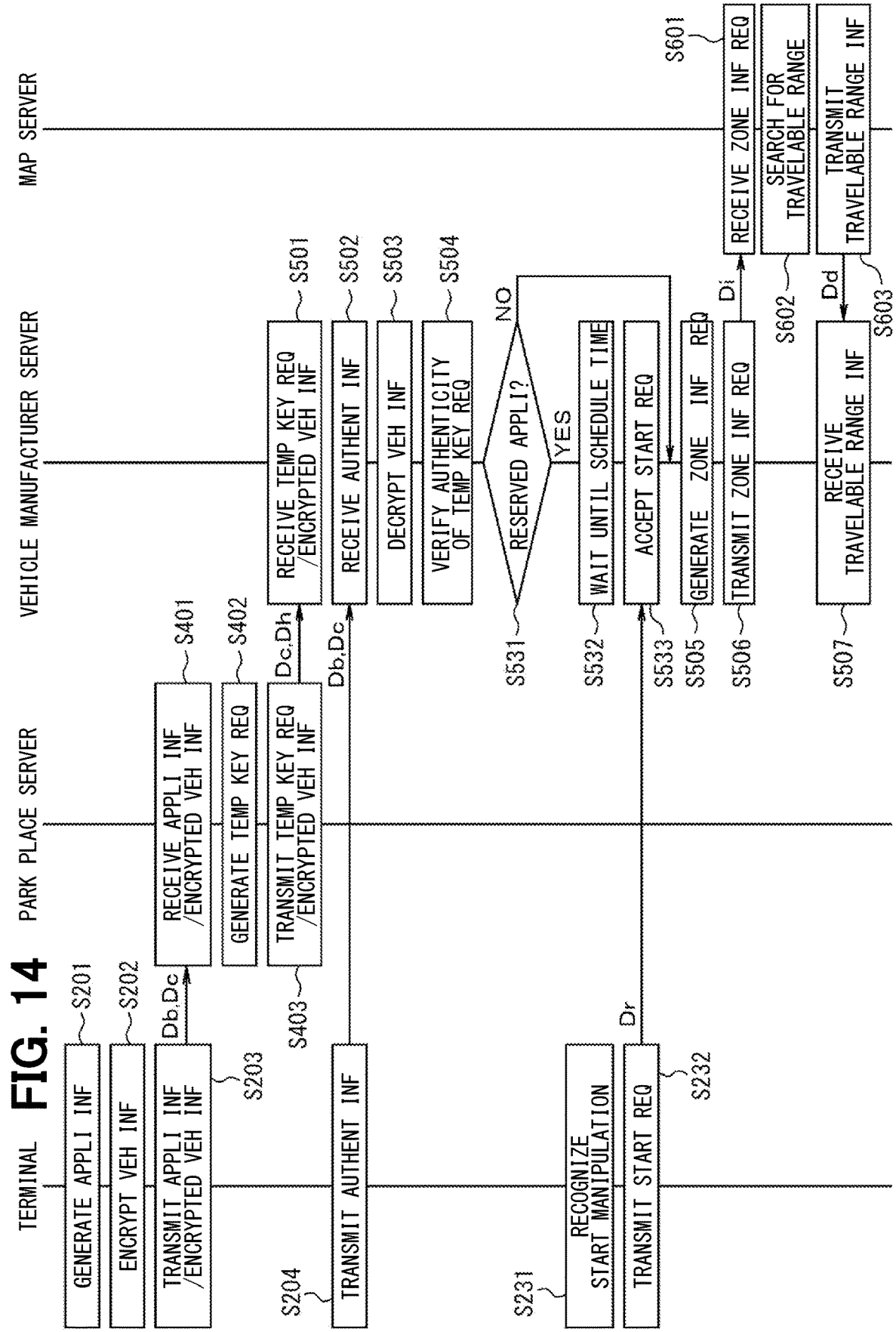
FIG. 14 is a drawing illustrating a process flow of each part when the automatic valet parking according to a sixth embodiment is performed.

With reference to FIG. 14, the description below explains a sixth embodiment that changes the first embodiment in processing details of the AVP when performed. Similar changes can be made to the second through fifth embodiments.

The above-described embodiments assume an on-demand application, namely, a situation where a user arrives at the parking place and then applies for AVP on site. For example, the AVP system 100 can respond to a situation where a user reserves AVP in advance. The description below depicts the on-demand application as a post-arrival application and depicts the prior application based on the reservation in advance as a reserved application.

In this case, the valet parking implementation time is contained in application information db that is transmitted from the terminal device 200 to the vehicle manufacturer server apparatus 500, for example. The valet parking implementation time corresponds to the present time for the post-arrival application and corresponds to the scheduled time specified by the user for the reserved application. The valet parking implementation time is input in response to a user's manipulation for the application. The scheduled time for loading corresponds to the time to start the valet parking, namely, the time when the automobile 300 starts from a specified boarding place. The scheduled time for unloading corresponds to the time to complete the valet parking, namely, the time when the automobile 300 arrives at a specified exiting place and stops.

Application information db contains the above-described information. Therefore, the present embodiment can identify whether the applied valet parking corresponds to the post-arrival application or the reserved application, based on the contents of application information db. The vehicle manufacturer server apparatus 500 completes the information verification process, namely, the process in step S504 that verifies the authenticity of temporary key request Dh. Then, the vehicle manufacturer server apparatus 500 determines the time to start the next step, namely, step S505 that generates zone information request Di The post-arrival application assumes that the automobile 300 already arrives at the parking place and the valet parking is immediately available. In the event of the post-arrival application, the vehicle manufacturer server apparatus 500 proceeds to the next step as soon as the information verification process is complete. The reserved application assumes that the automobile 300 does not arrive at the parking place yet and the valet parking is unavailable at the time. In the event of the reserved application, the vehicle manufacturer server apparatus 500 waits until the user-specified scheduled time for the valet parking without advancing the process.

The loading based on the reserved application requires confirming whether the automobile 300 arrives at the parking place by the scheduled time. In this case, the user responsible for the reserved application performs a specified manipulation on the terminal device 200 to confirm the arrival at the parking place. The arrival of the automobile 300 at the parking place can be confirmed by using various methods in which the user enters a reservation number to an entry acceptance device provided for the parking place or the automobile 300 communicates with the parking place server apparatus 400 when passing through an entrance gate of the parking place, for example.

The unloading based on the reserved application has no need for the confirmation needed for the loading. The process proceeds so that the automobile 300 arrives at the specified exiting place by the user-specified scheduled time. In this case, it is necessary to find the time required for the automobile 300 to move from the parking slot to the exiting place. The timing to perform the next step is found by subtracting the required time from the scheduled time. The required time can be found by adding the time needed for the automobile 300 to start the engine, the time needed for the automobile 300 to make preparations for the start, and the actual travel time.

For example, when the user specifies the reservation time at "10:30 a.m." and the required time for "three minutes," the vehicle manufacturer server apparatus 500 performs the next step at "10:27 a.m." After applying for the reserved unloading, the user need not await the arrival of the automobile 300 at a specified exiting place. The user can eliminate the wait time, thus improving the convenience.

FIG. 14 illustrates the contents of the process from applying for the AVP to receiving the travelable range according to the present embodiment. The process according to the present embodiment supplements the comparable process according to the first embodiment with the addition of steps S231 and S232 performed by the terminal device 200 and steps S531 through S533 performed by the vehicle manufacturer server apparatus 500.

In this case, the vehicle manufacturer server apparatus 500 determines in step S504 that temporary key request Dh is authentic, and then proceeds to step S531 to determine the time to start the process in step S505 corresponding to the next step described above. Namely, in step S531, the vehicle manufacturer server apparatus 500 determines whether the reserved application takes effect based on application information db. The vehicle manufacturer server apparatus 500 may determine that the reserved application does not take effect but the post-arrival application takes effect. Then, step S531 results in "NO." The vehicle manufacturer server apparatus 500 proceeds to step S505 and subsequently performs the process similar to the first embodiment. In this case, the user already arrives at the parking place. The valet parking is performed as soon as the subsequent process is complete.

The vehicle manufacturer server apparatus 500 may determine that the reserved application takes effect. In this case, step S531 results in "YES." The vehicle manufacturer server apparatus 500 proceeds to step S532 and waits until the user-specified scheduled time. When the user subsequently arrives at the parking place and performs a specified starting manipulation, the terminal device 200 recognizes the starting manipulation in step S231 and proceeds to step S232.

In step S232, the terminal device 200 transmits start request Dr requesting to start the valet parking to the vehicle manufacturer server apparatus 500. In step S533, the vehicle manufacturer server apparatus 500 receives start request Dr, then proceeds to step S505, and subsequently performs the process similar to the first embodiment. The post-arrival application or the unloading based on the reserved application does not require steps S231 and S232 for the terminal device 200 and step S533 for the vehicle manufacturer server apparatus 500.

As above, the system according to the present embodiment assumes that a user reserves the AVP in advance. But then again, like the first embodiment, the present embodiment also allows the vehicle manufacturer server apparatus 500 and the automobile 300 to directly exchange the temporary key as a digital key for the automobile 300. The temporary key is not supplied to the parking place server apparatus 400. Therefore, the present embodiment also provides an effect similar to the first embodiment.

OTHER EMBODIMENTS

The present invention is not limited to the above-mentioned embodiments illustrated in the accompanying drawings but may be modified, combined, or enhanced variously within the spirit and scope of the disclosure.

Numeric values given in the above-described embodiments are examples and the present invention is not limited thereto.

The authentication according to the above-described embodiments uses temporary key Da and password Df but may use only temporary key Da.

As described in the above-described embodiments, the operation planning portions 308 and 404 can reliably generate operation plan Dg preventing the automobile 300 from going out of the parking place by using effective zone information Dd supplied from the map server apparatus 600 such as the map information around the parking place and the information about the stall between the parking place and the outside. However, the AVP system may omit the map server apparatus 600. Even in this configuration, the operation planning portions 308 and 404 can reliably generate operation plan Dg preventing the automobile 300 from going out of the parking place based on map information in the parking place originally stored in the parking place server apparatus 400.

The present disclosure has been described with reference to the embodiments but is not limited to the embodiments and structures. The present disclosure covers various modification examples and modifications within a commensurate scope. In addition, the category or the scope of the idea of the present disclosure covers various combinations or forms and moreover the other combinations or forms including only one element or more or less in the former.

The control portion and its technique described in the present disclosure may be embodied by a dedicated computer including a memory and a processor that is programmed to execute one or more functions implemented by a computer program. Moreover, the control portion and its technique described in the present disclosure may be embodied by a dedicated computer including a processor comprised of one or more dedicated hardware logic circuits. Further, the control portion and its technique described in the present disclosure may be embodied by one or more dedicated computers each configured as a combination of a processor programmed to execute one or more functions and a processor comprised of a memory and one or more hardware logic circuits. The computer program as an instruction executed by the computer may be stored in a computer-readable non-transitory tangible storage medium.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S201. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An automatic valet parking system to perform valet parking under autonomous driving control, the automatic valet parking system comprising:
   a terminal device;
   a vehicular device arranged on a vehicle;
   a parking place server arranged for a parking place; and
   a vehicle manufacturer server directly or indirectly controlled by a vehicle manufacturer, wherein:
   the terminal device, the vehicular device, the parking place server, and the vehicle manufacturer server are configured to mutually transmit and receive data;
   the terminal device includes an application information generator;
   the parking place server includes a key request generator;
   the vehicle manufacturer server includes a key request verification portion and a temporary key generator;
   at least one of the parking place server and the vehicular device includes a drive planning portion;
   the vehicular device includes an autonomous driving controller;
   the application information generator generates application information as information about an application for the valet parking and transmits the application information to the parking place server and the vehicle manufacturer server;
   the key request generator receives the application information transmitted from the terminal device, generates a temporary key request for requesting to generate a temporary key, and transmits the temporary key request to the vehicle manufacturer server;
   the key request verification portion receives the application information transmitted from the terminal device, receives the temporary key request transmitted from the parking place server, and verifies authenticity of the temporary key request;

when the key request verification portion provides a verification result to be true, the temporary key generator generates the temporary key and transmits the temporary key to the vehicular device;

the drive planning portion generates a drive plan including a route to a targeted parking position for the vehicle; and when the autonomous driving controller receives the temporary key transmitted from the vehicle manufacturer server, the autonomous driving controller performs autonomous driving control according to the drive plan generated by the drive planning portion.

2. The automatic valet parking system according to claim 1, wherein:

when generating the temporary key, the temporary key generator further generates a password to validate the temporary key and transmits the password to the vehicular device via the parking place server; and when the autonomous driving controller receives the temporary key transmitted from the vehicle manufacturer server and receives the password transmitted from the parking place server, the autonomous driving controller performs the autonomous driving control according to the drive plan generated by the drive planning portion.

3. The automatic valet parking system according to claim 2, wherein:

the drive planning portion is disposed in the parking place server;

the vehicular device further includes a key verification portion;

when the drive planning portion receives the password transmitted from the vehicle manufacturer server, the drive planning portion transmits the password and the drive plan to the vehicular device;

when the key verification portion receives the temporary key transmitted from the vehicle manufacturer server and receives the password transmitted from the parking place server, the key verification portion verifies whether a combination of the temporary key and the password is proper;

when the key verification portion provides the verification result that the combination is proper, the autonomous driving controller determines that the drive plan transmitted together with the password is available, and performs the autonomous driving control according to the drive plan.

4. The automatic valet parking system according to claim 2, wherein:

the drive planning portion is disposed in the vehicular device;

the parking place server further includes a parking position determination portion and a plan verification portion;

the vehicular device further includes a key verification portion;

when the parking position determination portion receives the password transmitted from the vehicle manufacturer server, the parking position determination portion determines the targeted parking position, and transmits the password to the vehicular device together with target position information as information about determined targeted parking position;

when the key verification portion receives the temporary key transmitted from the vehicle manufacturer server and receives the password transmitted from the parking place server, the key verification portion verifies whether a combination of the temporary key and the password is proper;

when the key verification portion provides the verification result that the combination is proper, the drive planning portion generates the drive plan based on the target position information and transmits the drive plan to the parking place server;

when the plan verification portion receives the drive plan transmitted from the vehicular device, the plan verification portion verifies whether the drive plan is proper;

when the drive plan is proper, the plan verification portion transmits availability information representing the drive plan to be available to the vehicle; and when the autonomous driving controller receives the availability information transmitted from the parking place server, the autonomous driving controller performs the autonomous driving control according to the drive plan generated by the drive planning portion.

5. The automatic valet parking system according to claim 3, further comprising:

a map server including an effective zone acquisition portion that acquires effective zone information as information about an effective zone for the temporary key, wherein:

the vehicle manufacturer server further includes a zone request generator;

the zone request generator generates a zone information request for requesting to transmit the effective zone information, and transmits the zone information request to the map server;

when the effective zone acquisition portion receives the zone information request transmitted from the vehicle manufacturer server, the effective zone acquisition portion acquires the effective zone information, and transmits the effective zone information to the vehicle manufacturer server;

the temporary key generator transmits the effective zone information together with the temporary key to the vehicular device; and the autonomous driving controller determines whether the drive plan is available according to the verification result of verifying the drive plan transmitted from the parking place server with the effective zone information transmitted from the vehicle manufacturer server.

6. The automatic valet parking system according to claim 4, further comprising:

a map server including an effective zone acquisition portion that acquires effective zone information as information about an effective zone for the temporary key, wherein:

the vehicle manufacturer server further includes a zone request generator;

the zone request generator generates a zone information request for requesting to transmit the effective zone information, and transmits the zone information request to the map server;

when the effective zone acquisition portion receives the zone information request transmitted from the vehicle manufacturer server, the effective zone acquisition portion acquires the effective zone information, and transmits the effective zone information to the vehicle manufacturer server;

the temporary key generator transmits the effective zone information together with the temporary key to the vehicular device; and when the drive planning portion receives the effective zone information transmitted from the vehicle manufacturer server, the drive planning portion generates the drive plan according to the effective zone information.

7. The automatic valet parking system according to claim 1, further comprising:
   one or more processors; and
   a memory coupled to the one or more processors and storing program instructions that when executed by the one or more processors cause the one or more processors to provide at least: the application information generator; the key request generator; the key request verification portion; the temporary key generator; and the drive planning portion.

8. A computer-readable non-transitory tangible storage medium comprising instructions being executed by a computer, the instructions including an automatic valet parking method for executing valet parking under autonomous driving control by a terminal device, a vehicular device, a parking place server arranged for a parking place, and a vehicle manufacturer server directly or indirectly controlled by a vehicle manufacturer, wherein the terminal device, the vehicular device, the parking place server, and the vehicle manufacturer server are configured to mutually transmit and receive data, the instructions comprising:
   performing an application information generating procedure using the terminal device;
   performing a key request generating procedure using the parking place server;
   performing a key request verification procedure and a temporary key generating procedure using the vehicle manufacturer server;
   performing a drive plan procedure using at least one of the parking place server and the vehicular device; and
   performing an autonomous driving control procedure using the vehicular device, wherein:
   the application information generating procedure includes: generating application information as information about an application of the valet parking and transmitting the application information to the parking place server and the vehicle manufacturer server;
   the key request generating procedure includes: receiving the application information transmitted from the terminal device; generating a temporary key request for requesting to generate a temporary key, and transmitting the temporary key request to the vehicle manufacturer server;
   the key request verification procedure includes: receiving the application information transmitted from the terminal device; receiving the temporary key request transmitted from the parking place server; and verifying authenticity of the temporary key request;
   the temporary key generating procedure includes: generating the temporary key and transmitting the temporary key to the vehicle when a verification result in the key request verification procedure is true;
   the drive plan procedure includes: generating a drive plan including a route to a targeted parking position for a vehicle; and
   the autonomous driving control procedure includes: performing autonomous driving control according to the drive plan generated in the drive planning procedure when receiving the temporary key transmitted from the vehicle manufacturer server.

* * * * *